(12) United States Patent
Ozcan et al.

(10) Patent No.: US 11,514,325 B2
(45) Date of Patent: Nov. 29, 2022

(54) METHOD AND SYSTEM FOR PHASE RECOVERY AND HOLOGRAPHIC IMAGE RECONSTRUCTION USING A NEURAL NETWORK

(71) Applicant: THE REGENTS OF THE UNIVERSITY OF CALIFORNIA, Oakland, CA (US)

(72) Inventors: Aydogan Ozcan, Los Angeles, CA (US); Yair Rivenson, Los Angeles, CA (US); Yichen Wu, Los Angeles, CA (US); Yibo Zhang, Los Angeles, CA (US); Harun Gunaydin, Clifton Heights, PA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 924 days.

(21) Appl. No.: 16/359,609

(22) Filed: Mar. 20, 2019

(65) Prior Publication Data
US 2019/0294108 A1 Sep. 26, 2019

Related U.S. Application Data

(60) Provisional application No. 62/667,609, filed on May 6, 2018, provisional application No. 62/646,297, filed on Mar. 21, 2018.

(51) Int. Cl.
*G06N 3/08* (2006.01)
*G06N 3/02* (2006.01)
(Continued)

(52) U.S. Cl.
CPC .......... *G06N 3/084* (2013.01); *G03H 1/0443* (2013.01); *G03H 1/0486* (2013.01);
(Continued)

(58) Field of Classification Search
CPC .......... G06N 3/084; G06N 3/02; G06N 3/067; G06N 3/08; G03H 1/0443; G03H 1/0486; G03H 1/2202; G03H 2001/005
See application file for complete search history.

(56) References Cited

U.S. PATENT DOCUMENTS

2012/0099803 A1   4/2012   Ozcan et al.
2012/0148141 A1   6/2012   Ozcan et al.
(Continued)

OTHER PUBLICATIONS

Yair Rivenson, Yibo Zhang, Harun Günaydin, Da Teng and Aydogan Ozcan. Phase recovery and holographic image reconstruction using deep learning in neural networks. Light: Science & Applications accepted article preview Oct. 13, 2017; doi: 10.1038/lsa.2017.141 (Year: 2017).*

(Continued)

*Primary Examiner* — Lut Wong
(74) *Attorney, Agent, or Firm* — Vista IP Law Group LLP

(57) ABSTRACT

A method of performing phase retrieval and holographic image reconstruction of an imaged sample includes obtaining a single hologram intensity image of the sample using an imaging device. The single hologram intensity image is back-propagated to generate a real input image and an imaginary input image of the sample with image processing software, wherein the real input image and the imaginary input image contain twin-image and/or interference-related artifacts. A trained deep neural network is provided that is executed by the image processing software using one or more processors and configured to receive the real input image and the imaginary input image of the sample and generate an output real image and an output imaginary image in which the twin-image and/or interference-related artifacts are substantially suppressed or eliminated. In some embodiments, the trained deep neural network simultane- (Continued)

ously achieves phase-recovery and auto-focusing significantly extending the DOF of holographic image reconstruction.

28 Claims, 15 Drawing Sheets

(51) Int. Cl.
*G03H 1/22* (2006.01)
*G03H 1/04* (2006.01)
*G06N 3/067* (2006.01)
*G03H 1/00* (2006.01)

(52) U.S. Cl.
CPC ............. *G03H 1/2202* (2013.01); *G06N 3/02* (2013.01); *G06N 3/067* (2013.01); *G06N 3/08* (2013.01); *G03H 2001/005* (2013.01)

(56) References Cited

U.S. PATENT DOCUMENTS

| | | |
|---|---|---|
| 2012/0157160 A1 | 6/2012 | Ozcan et al. |
| 2012/0218379 A1 | 8/2012 | Ozcan et al. |
| 2012/0248292 A1 | 10/2012 | Ozcan et al. |
| 2012/0281899 A1 | 11/2012 | Ozcan et al. |
| 2013/0092821 A1 | 4/2013 | Ozcan et al. |
| 2013/0157351 A1 | 6/2013 | Ozcan et al. |
| 2013/0193544 A1 | 8/2013 | Ozcan et al. |
| 2013/0203043 A1 | 8/2013 | Ozcan et al. |
| 2013/0258091 A1 | 10/2013 | Ozcan et al. |
| 2013/0280752 A1 | 10/2013 | Ozcan et al. |
| 2014/0120563 A1 | 5/2014 | Ozcan et al. |
| 2014/0160236 A1 | 6/2014 | Ozcan et al. |
| 2014/0300696 A1 | 10/2014 | Ozcan et al. |
| 2015/0111201 A1 | 4/2015 | Ozcan et al. |
| 2015/0153558 A1 | 6/2015 | Ozcan et al. |
| 2015/0204773 A1 | 7/2015 | Ozcan et al. |
| 2015/0357083 A1 | 12/2015 | Ozcan et al. |
| 2016/0070092 A1 | 3/2016 | Ozcan et al. |
| 2016/0161409 A1 | 6/2016 | Ozcan et al. |
| 2016/0327473 A1 | 11/2016 | Ozcan et al. |
| 2016/0334614 A1 | 11/2016 | Ozcan et al. |
| 2017/0153106 A1 | 6/2017 | Ozcan et al. |
| 2017/0160197 A1 | 6/2017 | Ozcan et al. |
| 2017/0168285 A1 | 6/2017 | Ozcan et al. |
| 2017/0220000 A1 | 8/2017 | Ozcan et al. |
| 2018/0003686 A1 | 1/2018 | Ozcan et al. |
| 2018/0052425 A1 | 2/2018 | Ozcan et al. |
| 2018/0196193 A1 | 7/2018 | Ozcan et al. |
| 2018/0292784 A1* | 10/2018 | Nguyen ................ G02B 21/18 |
| 2018/0373921 A1 | 12/2018 | Di Carlo et al. |

OTHER PUBLICATIONS

J. Wu, C. Leng, Y. Wang, Q. Hu and J. Cheng, "Quantized Convolutional Neural Networks for Mobile Devices," 2016 IEEE Conference on Computer Vision and Pattern Recognition (CVPR), 2016, pp. 4820-4828, doi: 10.1109/CVPR.2016.521. (Year: 2016).*

Abadi, Martin et al., TensorFlow: A system for large-scale machine learning, https://github.com/tensorflow/tensorflow, arXiv:1605.08695v2 [cs.DC] Mar. 31, 2016, pp. 1-18.

Farsiu, Sina et al., Fast and Robust Multiframe Super Resolution, IEEE Transactions on Image Processing, vol. 13, No. 10, Oct. 2004, pp. 1327-1344.

Greenbaum, Alon et al., Maskless imaging of dense samples using pixel super-resolution based multi-height lensfree on-chip microscopy, Jan. 30, 2012, vol. 20, No. 3, Optics Express, pp. 3129-3143.

He, Kaiming et al., Deep Residual Learning for Image Recognition, http://image-net.org/challenges/LSVRC/2015/ and http://mscoco.org/dataset/#detections-challenge20158, pp. 770-778 (2016).

Kingma, Diederik P. et al., Adam: A Method for Stochastic Optimization, Published as a conference paper at ICLR 2015, arXiv:1412.6980v9 [cs.LG] Jan. 30, 2017, pp. 1-15.

Luo, Wei et al., Propagation phasor approach for holographic image reconstruction, Scientific Reports, 6:22738, DOI:10.1038/srep22738, pp. 1-14.

Ren, Zhenbo et al., Autofocusing in digital holography using deep learning, Proc. of SPIE, vol. 10499, 104991V-1-104991V-8.

Rivenson, Yair et al., Phase recovery and holographic image reconstruction using deep learning in neural networks, Light: Science & Applications (2018) 7, 17141; doi:10.1038/lsa.2017.141, pp. 1-9.

Rivenson, Yair et al., Phase recovery and holographic image reconstruction using deep learning in neural networks, ArXiv170504286 Phys. (2017).

Rivenson, Yair et al., Deep learning microscopy, vol. 4, No. 11, Nov. 2017, Optica, pp. 1437-1443.

Ronneberger, Olaf et al., U-Net: Convolutional Networks for Biomedical Image Segmentation, arXiv:1505.04597v1 [cs.CV] May 18, 2015, pp. 1-8.

Shimobaba, Tomoyoshi et al., Convolutional neural network-based regression for depth prediction in digital holography, arXiv:1802.00664v1 [cs.CV] Feb. 2, 2018, pp. 1-4.

Sinha, Ayan et al., Lensless computational imaging through deep learning, vol. 4, No. 9, Sep. 2017, Optica, pp. 1117-1125.

Wu, Yichen et al., Extended depth-of-field in holographic imaging using deep-learning-based autofocusing and phase recovery, vol. 5, No. 6, Jun. 2018, Optica, pp. 704-710.

Zhang, Yibo et al., Accurate color imaging of pathology slides using holography and absorbance spectrum estimation of histochemical stains, J. Biophotonics. 2019; 12:e201800335.

* cited by examiner

Hologram
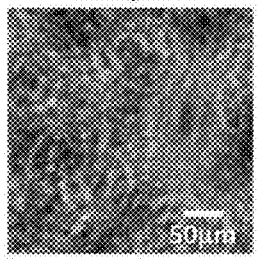
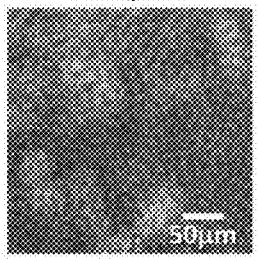
FIG. 6A    FIG. 6I
Network input
Amplitude    Phase    Amplitude    Phase
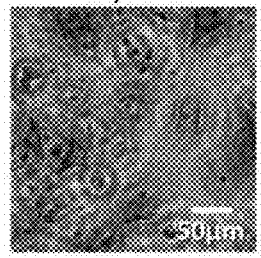 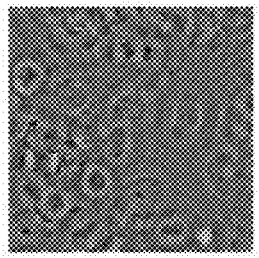 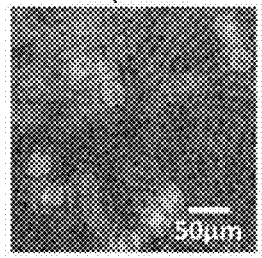 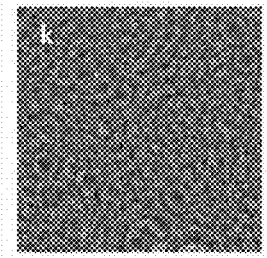
FIG. 6B   FIG. 6C   FIG. 6J   FIG. 6K
Network output from a single hologram
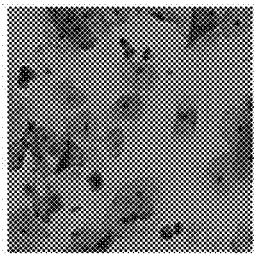 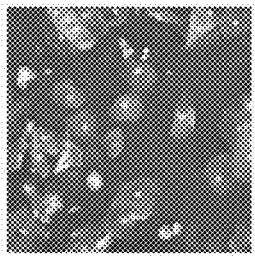 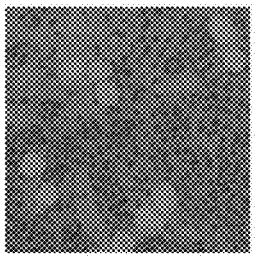 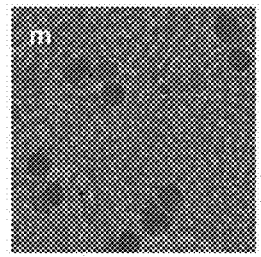
FIG. 6D   FIG. 6E   FIG. 6L   FIG. 6M
Multi-height reconstruction from 8 holograms
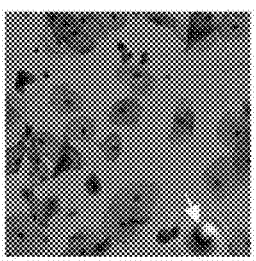 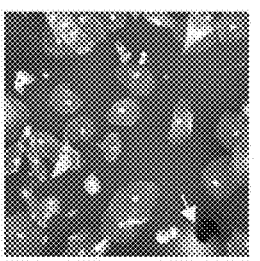 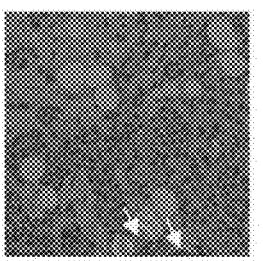 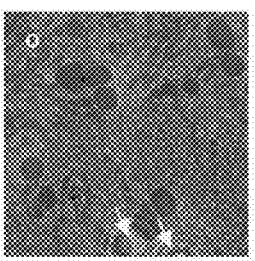
FIG. 6F   FIG. 6G   FIG. 6N   FIG. 6O
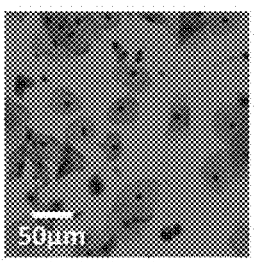 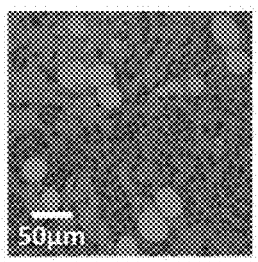
FIG. 6H    20× 0.5NA microscope image    FIG. 6P    20× 0.5NA microscope image

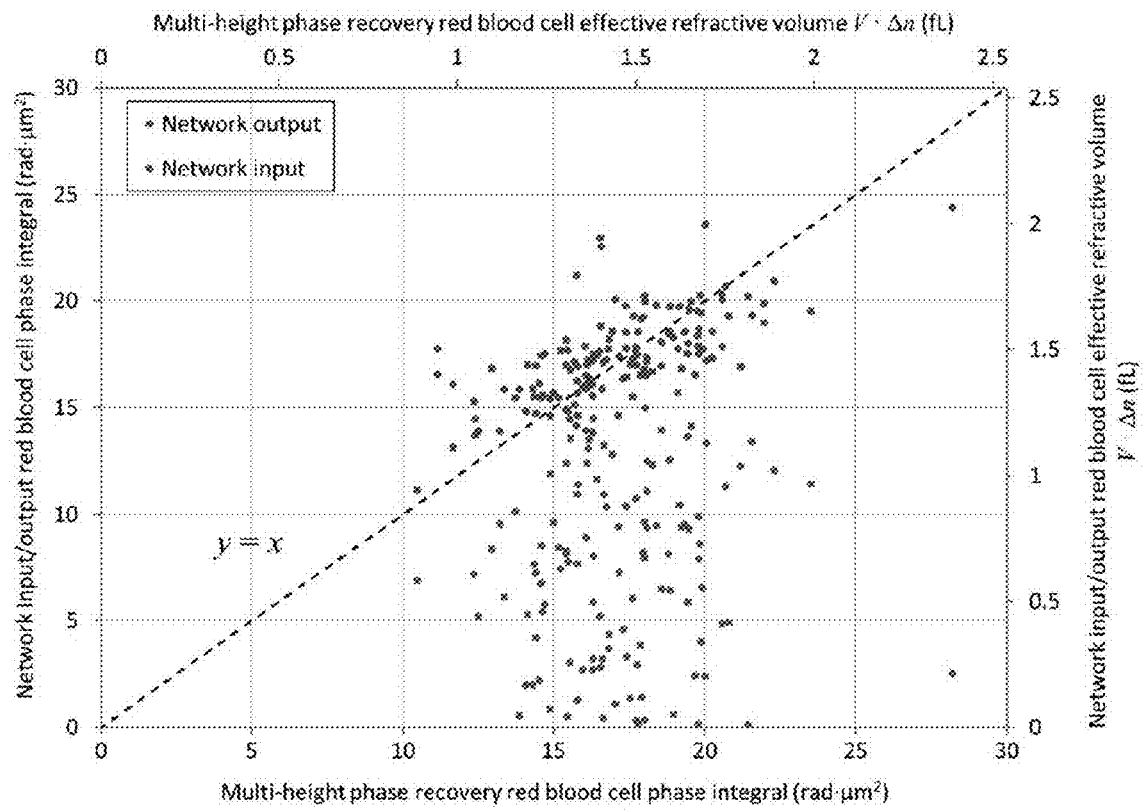
FIG. 7A
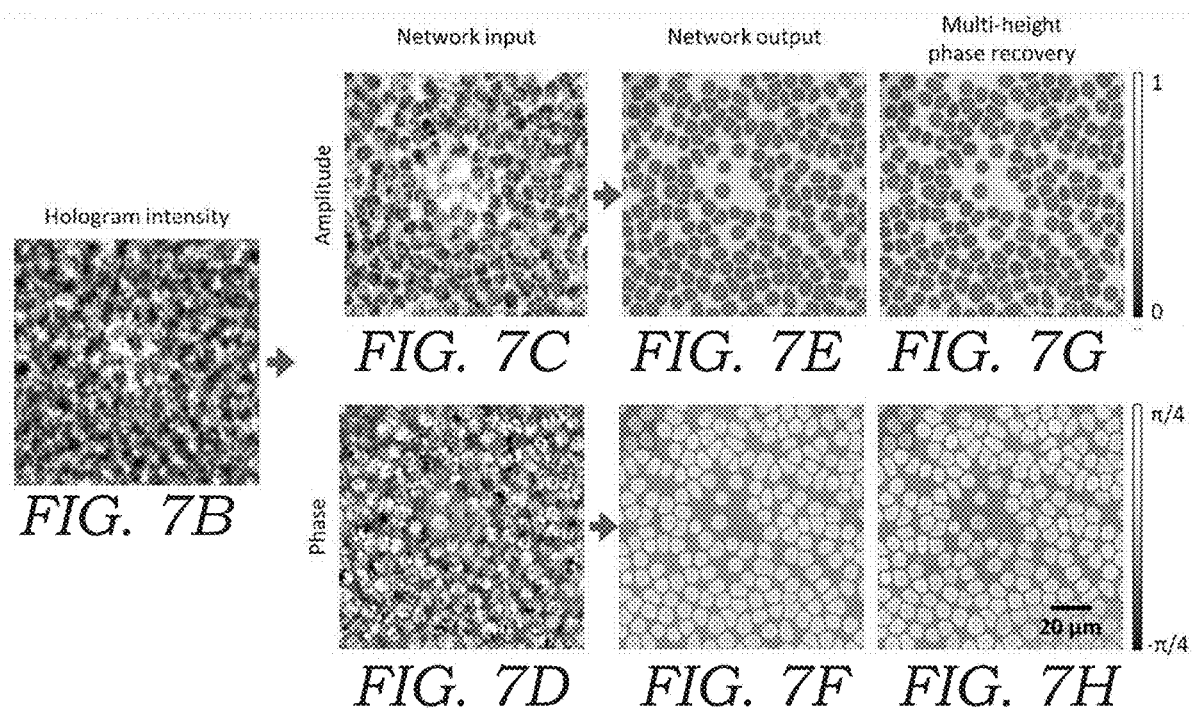
FIG. 7B  FIG. 7C  FIG. 7E  FIG. 7G
FIG. 7D  FIG. 7F  FIG. 7H

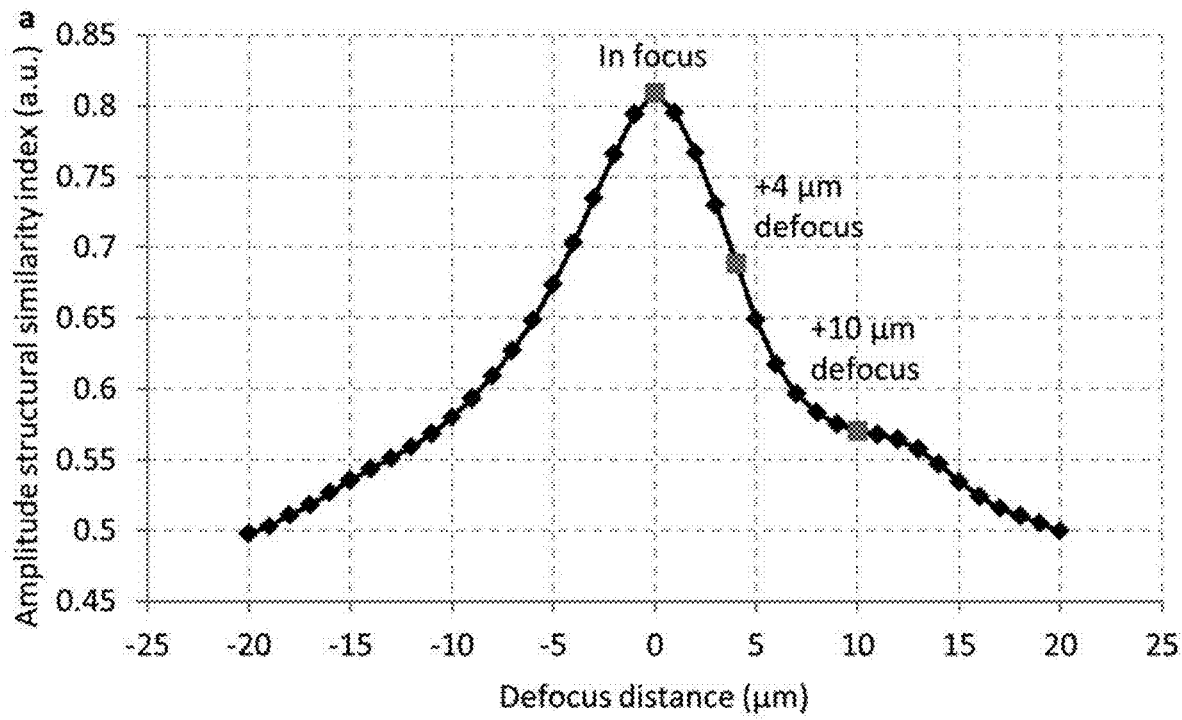
FIG. 8A
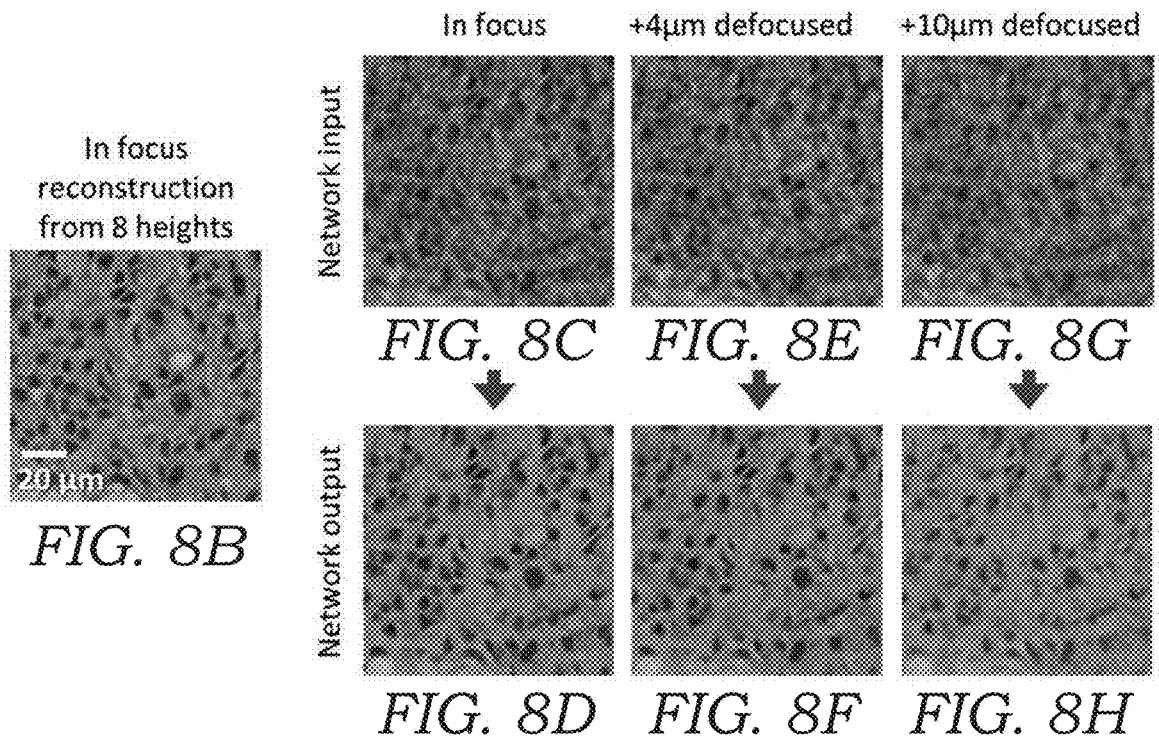
FIG. 8B
FIG. 8C FIG. 8E FIG. 8G
FIG. 8D FIG. 8F FIG. 8H

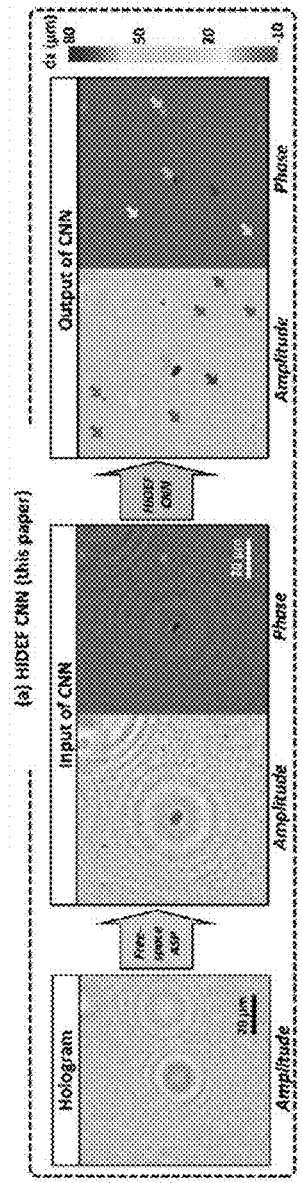
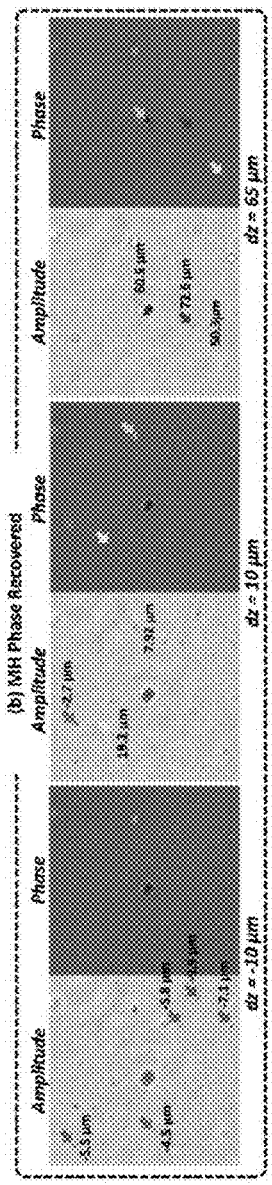
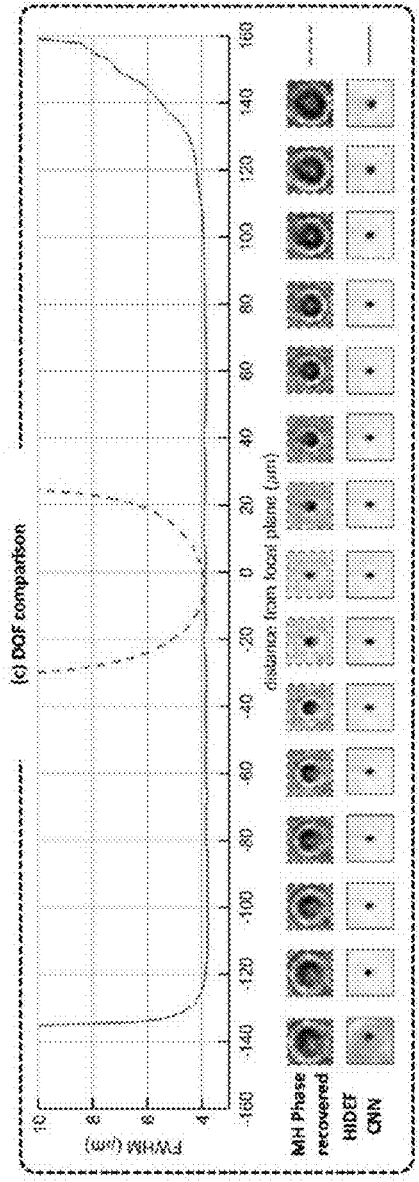
FIG. 13A
FIG. 13B
FIG. 13C

METHOD AND SYSTEM FOR PHASE RECOVERY AND HOLOGRAPHIC IMAGE RECONSTRUCTION USING A NEURAL NETWORK

RELATED APPLICATIONS

This Application claims priority to U.S. Provisional Patent Application No. 62/667,609 filed on May 6, 2018 and U.S. Provisional Patent Application No. 62/646,297 filed on Mar. 21, 2018, which are hereby incorporated by reference. Priority is claimed pursuant to 35 U.S.C. § 119 and any other applicable statute.

TECHNICAL FIELD

The technical field generally relates methods and systems used to perform phase recovery and holographic image reconstruction using a trained neural network. While the invention has particular application for phase recovery and image reconstruction for holographic images; the method may also be applied to other intensity-only measurements where phase recovery is needed.

STATEMENT REGARDING PRIOR DISCLOSURES BY THE INVENTOR OR A JOINT INVENTOR

The listed inventors (Ozcan, Rivenson, Zhang, and Gunaydin) to the current patent application have published aspects of the invention in the following publication: Yair Rivenson, Yibo Zhang, Harun Gunaydin, Da Teng, and Aydogan Ozcan, Phase recovery and holographic image reconstruction using deep learning in neural networks, Light: Science & Applications accepted article preview, Oct. 13, 2017; doi: 10.1038/lsa.2017.141.

BACKGROUND

Holography encodes the three-dimensional (3D) information of a sample through interference of the object's scattered light with a reference wave. Through this interference process, the intensity of a hologram that is recorded by imaging means such as, for example, an image sensor. Retrieval of this object information over the 3D sample space has been the subject of numerous holographic imaging techniques. In a holographic image reconstruction process, there are two major steps. One of these is the phase-recovery, which is required since only the intensity information of the holographic pattern is recorded by the image sensor for a given digital hologram. In general, for an off-axis holographic imaging system, this phase-recovery step can be achieved relatively easier compared to an in-line holography set-up, at the cost of a reduction in the space-bandwidth product of the imaging system. For in-line holography, however, iterative phase-recovery approaches that utilize measurement diversity and/or prior information regarding the sample have been developed. Regardless of the specific holographic set-up that is employed, phase-recovery needs to be performed to get rid of the twin-image and interference-related spatial artifacts in the reconstructed phase and amplitude images of the sample.

A second critical step in holographic image reconstruction is auto-focusing, where the sample-to-sensor distances (i.e., relative heights) of different parts of the 3D object need to be numerically estimated. Auto-focusing accuracy is vital to the quality of the reconstructed holographic image such that the phase-recovered optical field can be back-propagated to the correct 3D object locations. Conventionally, to perform auto-focusing, the hologram is digitally propagated to a set of axial distances, where a focusing criterion is evaluated at each resulting complex-valued image. This step is ideally performed after the phase-recovery step, but can also be applied before it, which might reduce the focusing accuracy. Various auto-focusing criteria have been successfully used in holographic imaging, including e.g., the Tamura coefficient, the Gini Index and others. Regardless of the specific focusing criterion that is used, and even with smart search strategies, the auto-focusing step requires numerical back-propagation of optical fields and evaluation of a criterion at typically >10-20 axial distances, which is time-consuming for even a small field-of-view (FOV). Furthermore, if the sample volume has multiple objects at different depths, this procedure needs to repeat for every object in the FOV.

Some recent work has utilized deep learning to achieve auto-focusing. For example, Z. Ren et al., Autofocusing in digital holography using deep learning, in Three-Dimensional and Multidimensional Microscopy: Image Acquisition and Processing XXV (International Society for Optics and Photonics, 2018), Vol. 10499, p. 104991V formulated auto-focusing as a classification problem and used a convolutional neural network (CNN) to provide rough estimates of the focusing distance with each classification class (i.e., bin) having an axial range of ~3 mm, which is more appropriate for imaging systems that do not need precise knowledge of the axial distance of each object. As another example, T. Shimobaba et al., Convolutional neural network-based regression for depth prediction in digital holography, ArXiv180200664 Cs Eess (2018) used a CNN regression model to achieve continuous auto-focusing, also with a relatively coarse focusing accuracy of >5 mm. In parallel to these recent results, CNN-based phase-recovery methods that use a single intensity-only hologram to reconstruct a two-dimensional object's image have also been demonstrated. However, in these former approaches the neural networks were trained with in-focus images, where the sample-to-sensor (hologram) distances were precisely known a priori based on the imaging set-up or were separately determined based on an auto-focusing criterion. As a result, the reconstruction quality degraded rapidly outside the system depth-of-field (DOF). For example, for high resolution imaging of a pathology slide (e.g., a tissue section), ~4 µm deviation from the correct focus distance resulted in loss of resolution and distorted the sub-cellular structural details.

SUMMARY

In one embodiment, a convolutional neural network-based method is used for phase recovery from intensity-only measurements, trained through deep learning that can perform phase recovery and holographic image reconstruction using a single intensity-only hologram. In one preferred aspect, this deep learning-enabled coherent image reconstruction framework is very fast to compute, taking only several seconds, e.g., ~3.9 sec on a graphics processing unit (GPU) based laptop computer to recover phase and amplitude images of a specimen over a field-of-view of 1 mm$^2$, containing ~7.3 megapixels in each image channel (amplitude and phase). This method was validated by reconstructing complex-valued images of various samples including e.g., blood and Papanicolaou (Pap) smears as well as thin sections of human tissue samples, all of which demonstrated successful elimination of the twin-image and interference-related spatial artifacts that arise due to lost phase information at the hologram detection process.

Stated somewhat differently, after training, the CNN learned to extract and separate the spatial features of the real image from the features of the twin-image and other undesired interference terms for both the phase and amplitude channels of the object. In some embodiments, the trained CNN simultaneously achieves phase-recovery and auto-focusing, significantly extending the DOF of holographic image reconstruction. Remarkably, this deep learning-based phase recovery and holographic image reconstruction method have been achieved without any modeling of light-matter interaction or wave interference. This framework opens up a myriad of opportunities to design fundamentally new coherent imaging systems (including electron holography, X-ray imaging, diffraction tomography, etc.), and can be broadly applicable to any phase recovery problem, spanning different parts of the electromagnetic spectrum, including e.g., visible wavelengths as well as electrons and X-rays.

In one embodiment, a method of performing phase retrieval and holographic image reconstruction of an imaged sample includes obtaining a single hologram intensity image of the sample using an image sensor (e.g., an image sensor found in a lens-free microscope image). This single hologram intensity image is then back propagated to generate a real input image and an imaginary input image of the sample, wherein the real input image and the imaginary input image contain twin-image and/or interference-related artifacts. According to one embodiment, a trained, deep neural network (e.g., a convolutional neural network) is provided that is executed using software running on one or more processors and configured to receive the real input image and the imaginary input image of the sample and generate an output real image and an output imaginary image in which the twin-image and/or interference-related artifacts are substantially suppressed or eliminated. The trained deep neural network are trained using one or more ground truth images along with a set of training images which can be used to establish parameters for the deep neural network (e.g., convolutional neural network). The particular trained deep neural network may be provided or executed depending on the type or nature of the sample that is to be imaged.

In one aspect of the invention, the deep neural network or convolutional neural network is trained using a plurality of training hologram intensity images. The training updates the neural network's parameter space Θ which includes kernels, biases, and weights. The convolution neural network may be programed using any number of software programs, although as described herein, Python was used in conjunction with TensorFlow framework for the deep neural network. Other software platforms may also be used. This can be executed using one or more processors typically found in computing devices such as computers. Network training of the deep neural network may optionally be performed by a dedicated graphical processing unit (GPU) or multiple GPUs.

In another embodiment, a method of performing phase retrieval and holographic image reconstruction of an imaged sample includes the operations of obtaining a single hologram intensity image of the sample using an imaging device. The single hologram intensity image is then back-propagated to generate a real input image and an imaginary input image of the sample with image processing software, wherein the real input image and the imaginary input image contain twin-image and/or interference-related artifacts. A trained deep neural network is provided (or has already provided) that is executed by software using one or more processors and configured to receive the real input image and the imaginary input image of the sample and generate an output real image and an output imaginary image in which the twin-image and/or interference-related artifacts are substantially suppressed or eliminated.

In another embodiment, a system for outputting improved phase and amplitude images from a single hologram image includes a computing device having image processing software executed thereon, the image processing software comprising a trained deep neural network that is executed using one or more processors of the computing device, wherein the trained deep neural network is trained with one or more ground truth images along with a set of training images are used to establish parameters for the deep neural network. The image processing software is configured to receive a single hologram intensity image of the sample and output an output real image and an output imaginary image in which the twin-image and/or interference-related artifacts are substantially suppressed or eliminated.

In another embodiment, the deep learning based holographic image reconstruction method performs both auto-focusing and phase-recovery at the same time using a single hologram intensity, which significantly extends the DOF of the reconstructed image compared to previous approaches. This approach which is also referred to herein as HIDEF (Holographic Imaging using Deep learning for Extended Focus) relies on training a CNN with not only in-focus image patches, but also with randomly de-focused holographic images along with their corresponding in-focus and phase-recovered images, used as reference. Overall, HIDEF boosts the computational efficiency of high-resolution holographic imaging by simultaneously performing auto-focusing and phase-recovery and increases the robustness of the image reconstruction process to potential misalignments in the optical set-up by significantly extending the DOF of the reconstructed images.

In one embodiment, a method of performing simultaneous phase-recovery and auto-focusing of a hologram intensity image of a sample is disclosed. The sample includes one or more objects therein. These objects may include particles, cells (stained or unstained), or other micro-scale objects. The method includes obtaining a single hologram intensity image of the sample using an image sensor and back propagating the single hologram intensity image using image processing software to generate a real input image and an imaginary input image of the sample, wherein the real input image and the imaginary input image contain twin-image and/or interference-related artifacts. The method uses a trained, convolutional neural network that is executed on image processing software using one or more processors, the trained convolutional neural network trained with pairs of randomly back-propagated de-focused images and their corresponding in-focus phase-recovered images. The trained, convolutional neural network is configured to receive the real input image and the imaginary input image of the sample and generate an output real image and an output imaginary image of one or more objects in the sample in which the twin-image and/or interference-related artifacts are substantially suppressed or eliminated and the output real and/or imaginary images of all the objects in the sample volume are brought into focus, all in parallel.

BRIEF DESCRIPTION OF THE DRAWINGS

FIGS. 6A-6P illustrate the comparison of the holographic reconstruction results for different types of samples. FIGS. 6A-6H illustrate images of Pap smears slides; FIGS. 6I-6P illustrate images of breast tissue sections. FIGS. 6A and 6I illustrates zoomed-in regions of interest from the acquired holograms. FIGS. 6B, 6C, 6J, 6K illustrate amplitude and phase images resulting from free-space backpropagation of a single hologram intensity, shown in FIG. 6A and FIG. 6I, respectively. These images are contaminated with twin-image and interference-related spatial artifacts due to the missing phase information at the hologram detection process. FIGS. 6D, 6E, 6L, 6M illustrate corresponding amplitude and phase images of the same samples obtained by the deep neural network, demonstrating the blind recovery of the complex object image without twin-image and interference-related artifacts using a single hologram. FIGS. 6F, 6G, 6N, 6O illustrate amplitude and phase images of the same samples reconstructed using multi-height phase retrieval with 8 holograms acquired at different sample-to-sensor distances. FIGS. 6H and 6P illustrate corresponding bright-field microscopy images of the same samples, shown for comparison. The arrows point to artifacts in FIGS. 6F, 6G, 6N, 6O (due to out-of-focus dust particles or other unwanted objects) and are significantly suppressed or eliminated by the network reconstruction as shown in FIGS. 6D, 6E, 6L, 6M.

FIG. 7A illustrates a graph showing the red blood cell volume estimation using the deep neural network-based phase retrieval. Using the reconstructed phase images of RBCs, the relative phase delay with respect to the background (where no cells are present) is calculated to reveal the phase integral per RBC (given in units of rad·$\mu m^2$).

FIG. 7B illustrates a single hologram intensity.

FIGS. 7C and 7D illustrate the amplitude and phase inputs obtained from the single hologram of FIG. 7B.

FIGS. 7E and 7F illustrate the deep neural network output (amplitude and phase), given the input of FIGS. 7C and 7D.

FIGS. 7G and 7H illustrate amplitude and phase images obtained using multi-height phase recovery. The deep neural network output images show a good match to the multi-height phase recovery-based cell volume estimation results of FIG. 7A, calculated using $N_{holo}$=8. The multi-height phase recovery results exhibit an out-of-focus fringe artifact at the center of the field-of-view FIGS. 7G and 7H.

FIG. 8A illustrates the amplitude structural similarity index (SSIM) for the estimation of the depth defocusing tolerance of the deep neural network for the neural network output images, when the input image is defocused, i.e., deviates from the optimal focus used in the training of the network.

FIG. 8B illustrates the multi-height reconstructed image obtained from eight (8) different heights.

FIGS. 8C and 8D illustrate, respectively, the network input and network output images obtained at an in-focus condition.

FIGS. 8E and 8F illustrate, respectively, the network input and network output images obtained at an out-of-focus condition (+4 μm).

FIGS. 8G and 8H illustrate, respectively, the network input and network output images obtained at an out-of-focus condition (+10 μm).

FIG. 13A illustrates how a single hologram is used subject to back propagation followed by input into the HIDEF CNN that generates the final or output amplitude and phase images. After its training, HIDEF CNN brings all the particles within the FOV into focus, while also performing phase-recovery. Each particle's depth is coded in the output image, with respect to the back-propagation distance (1 mm), as shown with the bar on the right.

FIG. 13B illustrates, as a comparison, multi-height, phase-recovered (MH-PR) images of the same FOV show that some of the particles come into focus at different depths, and become invisible or distorted at other depths. For each particle's arrow, the same coding is used as in FIG. 13A.

FIG. 13C shows the enhanced-DOF of HIDEF as illustrated by tracking a particle's amplitude full-width-half-maximum (FWHM) as a function of the axial defocus distance. HIDEF preserves the particle's FWHM diameter and its correct image across a large DOF of >0.2 mm, which is expected since it was trained for this range of defocus (±0.1 mm). On the other hand, MH-PR results show a much more limited DOF, as also confirmed with the same particle's amplitude images at different defocus distances, reported at the bottom. For each particle, its centroid is first manually selected. Then an auto-focusing step is performed using the multi-height (MH) phase recovered images by free-space propagating the reconstructed field-of-view (FOV) to different depths from −200 µm to 200 µm, and calculating the Tamura of Gradient (ToG) auto-focusing criterion on each image. Using a golden-ratio search, each particle depth was determined based on the maximum of the ToG criterion. To calculate the FWHM values reported in FIG. 13C, a small region around the selected centroid of a particle is cropped for each propagated image. Two one-dimensional (1D) cross-sections, along the x (horizontal) and y (vertical) directions are extracted from each region-of-interest. A quadratic fit is then used on both of these 1D cross-sections using a built-in MATLAB function (polyfit). Based on these fitted curves, the FWHM in each direction is determined to be the length in which the pixel contrast is above half of its original amplitude pixel contrast. Finally, the average of the FWHM values determined for the x and y directions is calculated, which is reported as the FWHM for the particles in FIG. 13C.

FIG. 15 illustrates structural similarity (SSIM) index values as a function of the axial defocus distance. Each one of these SSIM curves is averaged over 180 test FOVs (512-by-512 pixels) corresponding to thin sections of a human breast tissue sample. The results confirm the extended-DOF of the HIDEF network output images, up to the axial defocus range that it was trained for.

DETAILED DESCRIPTION OF THE ILLUSTRATED EMBODIMENTS

Figure 1:
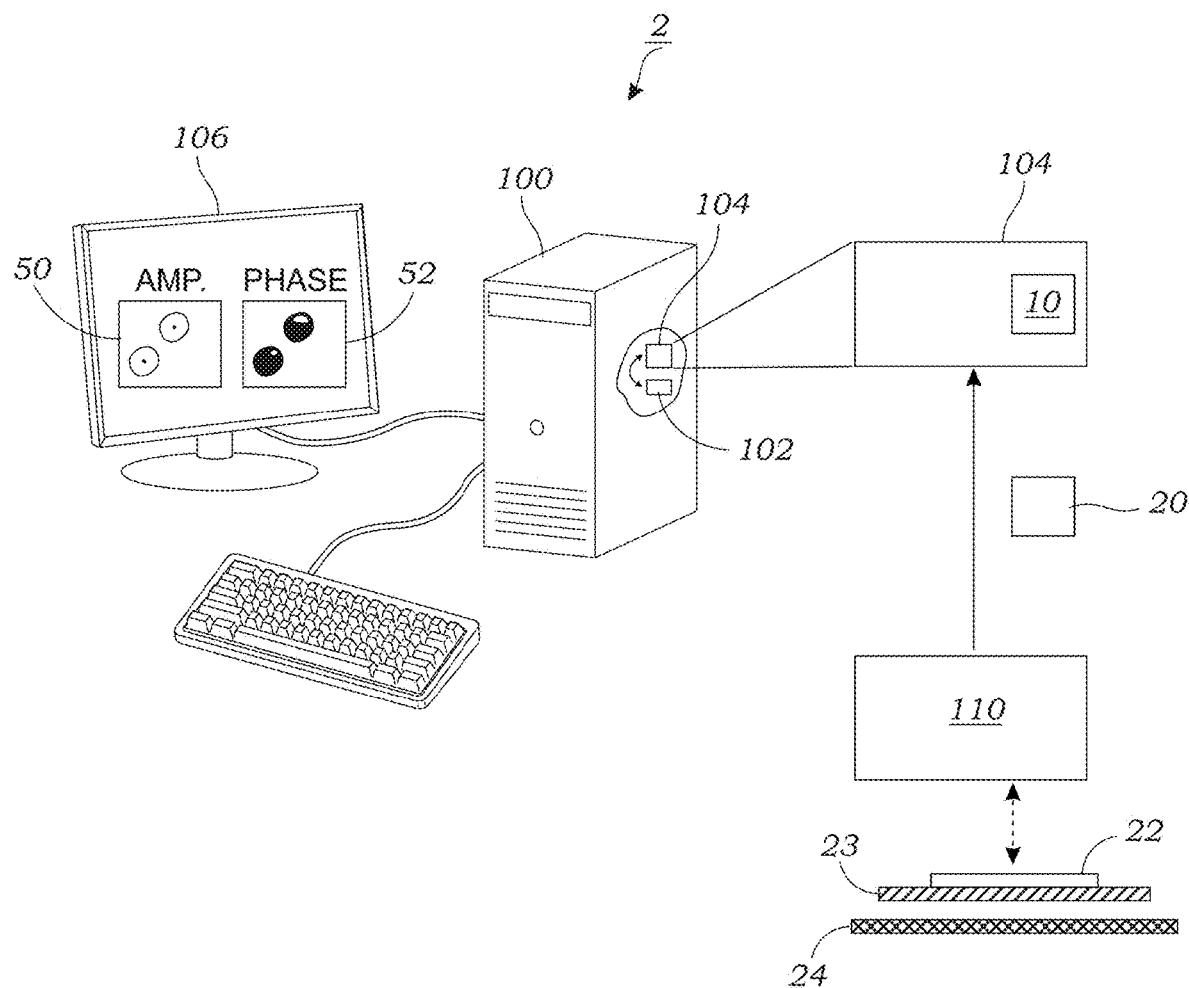
FIG. 1 schematically illustrates a system according to one embodiment that is used to output or generate an output real image and an output imaginary image in which the twin-image and/or interference-related artifacts are substantially suppressed or eliminated. In additional embodiments, the system also outputs real and/or imaginary images that are in-focus.

FIG. 1 schematically illustrates one embodiment of a system 2 for outputting amplitude and phase images 50, 52 from a single hologram image 20 in which the twin-image and/or interference-related artifacts are substantially suppressed or eliminated in the output images 50, 52. The system includes a computing device 100 that contains one or more processors 102 therein and image processing software 104 that incorporates the trained deep neural network 10 (e.g., a convolutional neural network). The computing device 100 may include, as explained herein, a personal computer, laptop, remote server, or the like, although other computing devices may be used (e.g., devices that incorporate one or more graphic processing units (GPUs)). As explained herein, the image processing software 104 can be implemented using Python and TensorFlow although other software packages and platforms may be used. The trained deep neural network 10 is not limited to a particular software platform or programming language and the trained deep neural network 10 may be executed using any number of commercially available software languages or platforms. The image processing software 104 that incorporates or runs in coordination with the trained deep neural network 10 may be run in a local environment or a remote cloud-type environment. In some embodiments, some functionality of the image processing software 104 may run in one particular language or platform (e.g., performs free space back-propagation, without phase retrieval) while the trained deep neural network 10 may run in another particular language or platform. Nonetheless, both operations are carried out by image processing software 104.

As seen in FIG. 1, the trained deep neural network 10 receives a single hologram intensity image 20 of a sample 22 obtained with an image sensor 24. The image sensor 24 may include a CMOS type image sensor that is well known and commercially available. The image 20 is obtained using an imaging device 110, for example, a holographic microscope, a lens-free microscope device, a device that creates or generates an electron hologram image, a device that creates or generates an x-ray hologram image, or other diffraction-based imaging device. The sample 22 may include tissue that is disposed on or in an optically transparent substrate 23 (e.g., a glass or plastic slide or the like). In this regard, the sample 22 may include a sample volume that is three dimensional. The sample 22 may also include particles, cells, or other micro-scale objects (those with micrometer-sized dimensions or smaller) located at various depths. The trained deep neural network 10 outputs or generates an output real image 50 and an output imaginary image 52 in which the twin-image and/or interference-related artifacts are substantially suppressed or eliminated. The system and method described herein rapidly outputs improved output images 50, 52 as explained herein. The images 50, 52 illustrated in FIG. 1 are shown displayed on a computer monitor 106 but it should be appreciated the images 50, 52 may be displayed on any suitable display (e.g., computer monitor, tablet computer, mobile computing device, mobile phone, etc.). In some embodiments, only the real (amplitude) image 50 may be displayed or outputted while in other embodiments only the imaginary (phase) image 52 is displayed or outputted. Of course, both the real and imaginary images 50, 52 by be displayed.

Figure 2:
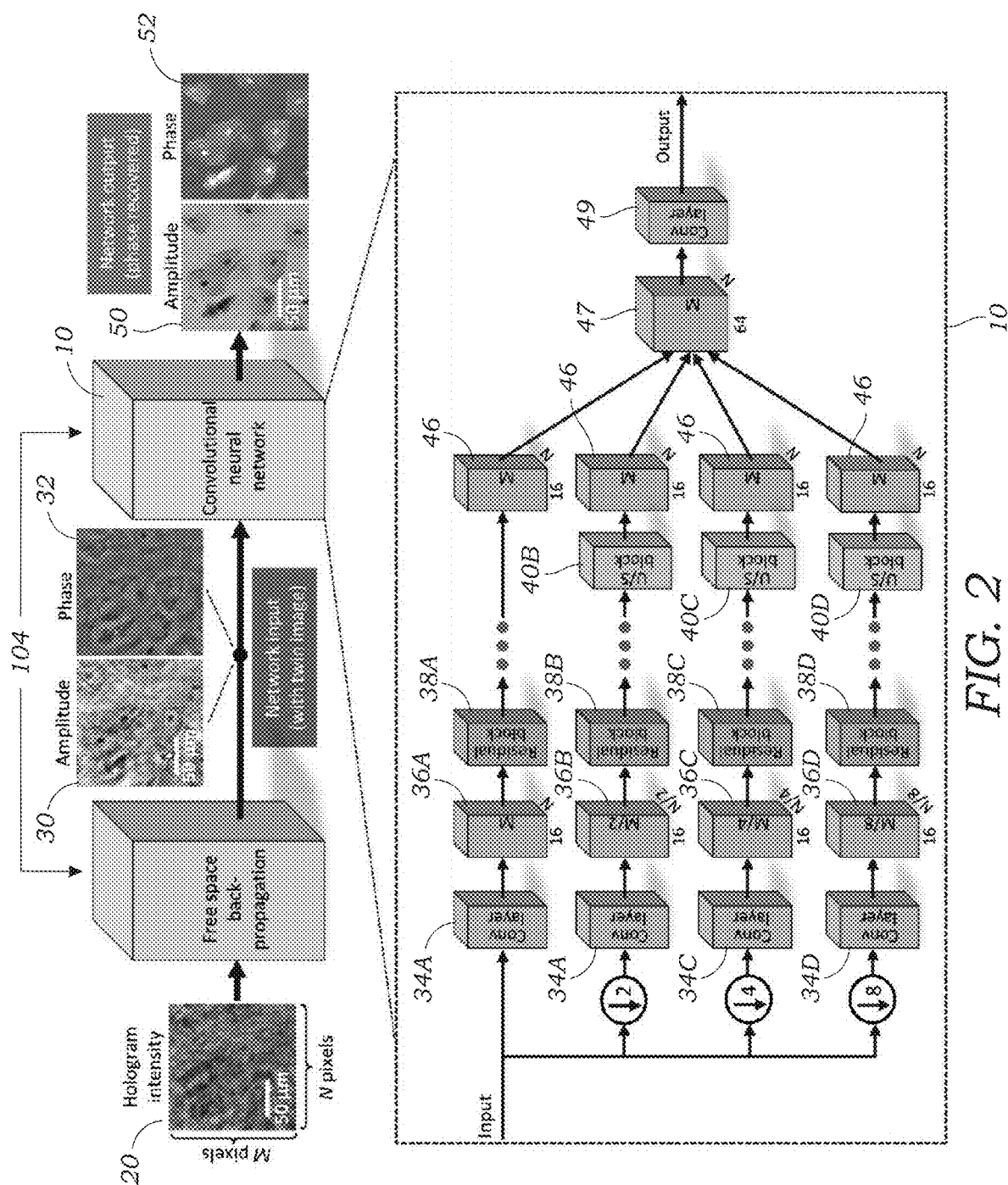
FIG. 2 is a schematic representation of the neural network operations that are conducted by the trained deep neural network (i.e., post-training phase). The deep neural network blindly outputs artifact-free phase and amplitude images of the object using only a single hologram intensity. This deep neural network is composed of convolutional layers, residual blocks and upsampling blocks and it rapidly processes a complex-valued input image in a parallel, multi-scale manner.

FIG. 2 is a schematic illustration of the operation of the system 2 as well as details regarding the trained deep neural network 10 that is used to generate amplitude and phase images 50, 52 in which the twin-image and/or interference-related artifacts are substantially suppressed or eliminated in the output images 50, 52. As seen in FIG. 2 a single hologram intensity image 20 of a sample 22 is obtained with an imaging device 110. In FIG. 2, the image processing software 104 performs free space back-propagation, without phase retrieval, to create a real input image 30 and an imaginary input image 32 of the sample. In one embodiment, back-propagation of the single hologram intensity image 20 is accomplished using the angular-spectrum propagation (ASP) or a transformation that is an approximation to ASP. Generally, in the ASP method, the complex-valued optical field is first transformed to the angular spectrum (spatial frequency) domain via a fast Fourier transform (FFT). The angular spectrum at is then multiplied with a spatial frequency-dependent phase factor parametrized by the wavelength, refractive index of the medium, and propagation distance to obtain the angular spectrum at a different z distance. Finally, the optical field is back-transformed to the spatial domain via an inverse FFT. Additional details regarding the ASP approach may be found in Zhang et al., Accurate color imaging of pathology slides using holography and absorbance spectrum estimation of histochemical stains, Journal of Biophotonics, October 2018, which is incorporated herein by reference.

These two images 30, 32 contains twin-image and interference-related artifacts, hiding the phase and amplitude information of objects in the sample 22. The two images 30, 32 are then input into the trained deep neural network 10 that blindly reconstructs amplitude and phase images 50, 52 in which the twin-image and/or interference-related artifacts are substantially suppressed or eliminated.

In the trained deep neural network 10, the back-propagated real and imaginary images 30, 32 of the single hologram intensity image 20 are used as two input channels to the trained deep neural network 10 each with a size of M×N pixels. These two channels of the network are then used simultaneously as input to four convolutional layers 34A, 34B, 34C, 34D. The output of each convolutional layer (34A, 34B, 34C, 34D) is sixteen channels (feature maps), each with a size of M×N pixels, which was empirically determined to balance the size/compactness and performance of the trained deep neural network 10. The output of these four convolutional layers is then downsampled by ×1, ×2, ×4, ×8, creating four different data flow paths (36A, 36B, 36C, 36D), with sixteen channels and spatial dimensions of M×N, M/2×N/2, M/4×N/4 and M/8×N/8, respectively. This multi-scale data processing scheme was created to allow the network 10 to learn how to suppress the twin-image and interference-related artifacts, created by objects with different feature sizes. The output of these downsampling operators 36A, 36B, 36C, 36D is followed by four residual blocks (38A, 38B, 38C, 38D), each composed of two convolutional layers 37 and two activation functions 39, which were chosen to be implemented as rectified linear units (ReLU), i.e., $ReLU(x)=\max(0,x)$. Residual blocks create a shortcut between the block's input and output, which allows a clear path for information flow between layers.

Figure 3:
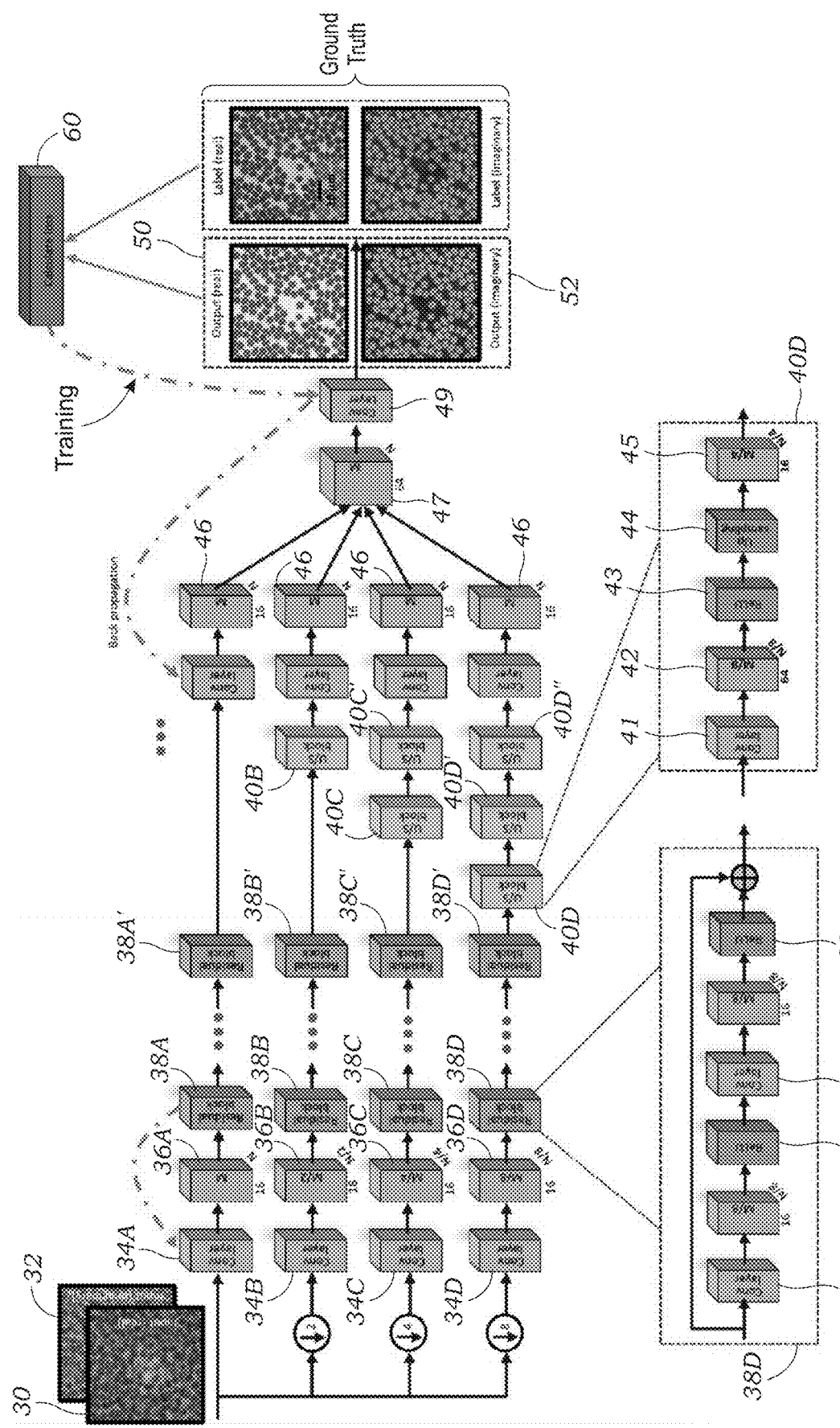
FIG. 3 is a schematic representation of the architecture of the deep neural network and its training. The neural network is composed of convolutional layers (i.e., cony layers), upsampling blocks (U/S blocks) and nonlinear activation functions (ReLU).

Following the four residual blocks 38A, 38B, 38C, 38D, data at each scale are upsampled to match the original data dimensions as seen in U/S blocks 40B, 40C, 40D. As best seen in FIG. 3, each upsampling block (i.e., U/S blocks 40B, 40C, 40D in FIG. 2) contains a convolutional layer 41 that takes sixteen channels, each with M/L×N/L pixels as input, and outputs sixty-four channels each with M/L×N/L pixels (L=2, 4, 8) and seen in operation 42 of FIG. 3. This is followed by a ReLU operation 43 and an upsampling layer 44. This layer 44 learns to upsample a sixty-four channel input (each with M/L×N/L pixels) to a sixteen channel output 45 (each with 2M/L×2N/L pixels). This upsampling process is being performed once, twice, or three times, for the ×2, ×4, ×8 spatially downsampled network inputs, respectively (see FIGS. 2 and 3). The output of each one of these four different dataflow paths (with 16 channels, M×N pixels as seen in operation 46, following the upsampling stage) is concatenated to a sixty-four channels input 47, which, following a final convolution layer 49, takes the concatenated 64 channels and outputs two channels: one for the real image 50 and one for the imaginary image 52 of the object(s) in the sample 22, each having M×N pixels.

FIG. 3 further schematically illustrates the operation of the system 2 as well as details regarding the trained deep neural network 10 that is used to generate amplitude and phase images 50, 52 in which the twin-image and/or interference-related artifacts are substantially suppressed or eliminated in the output images 50, 52. Common elements to those of FIG. 2 are labeled as such. FIG. 3 also illustrates how the deep neural network 10 is trained to minimize a loss function as illustrated in operation 60 between the real and imaginary parts of the network output (Output (real), Output (imaginary)) with respect to the real and imaginary parts of the corresponding ground truth images (Label (real) and Label (imaginary)). In one embodiment, the minimization operation 60 minimizes the average of the mean-squared-errors of the real and imaginary parts of the network output (Output (real), Output (imaginary)) with respect to the real and imaginary parts of the object's ground truth images (Label (real) and Label (imaginary)). During the learning or training phase that creates the trained deep neural network 10 the error in the network output is back-propagated through the network 10 and the network's 10 parameter space $\Theta$ is optimized (described in further detail below). The network's 10 parameter space $\Theta$ contains the kernels, biases, and weights of the network 10 and by optimized and tuned using, for example, the Adaptive Moment Estimation (ADAM) based optimization.

Experimental—Phase Retrieval and Holographic Image Reconstruction

Figures 5A, 5B:
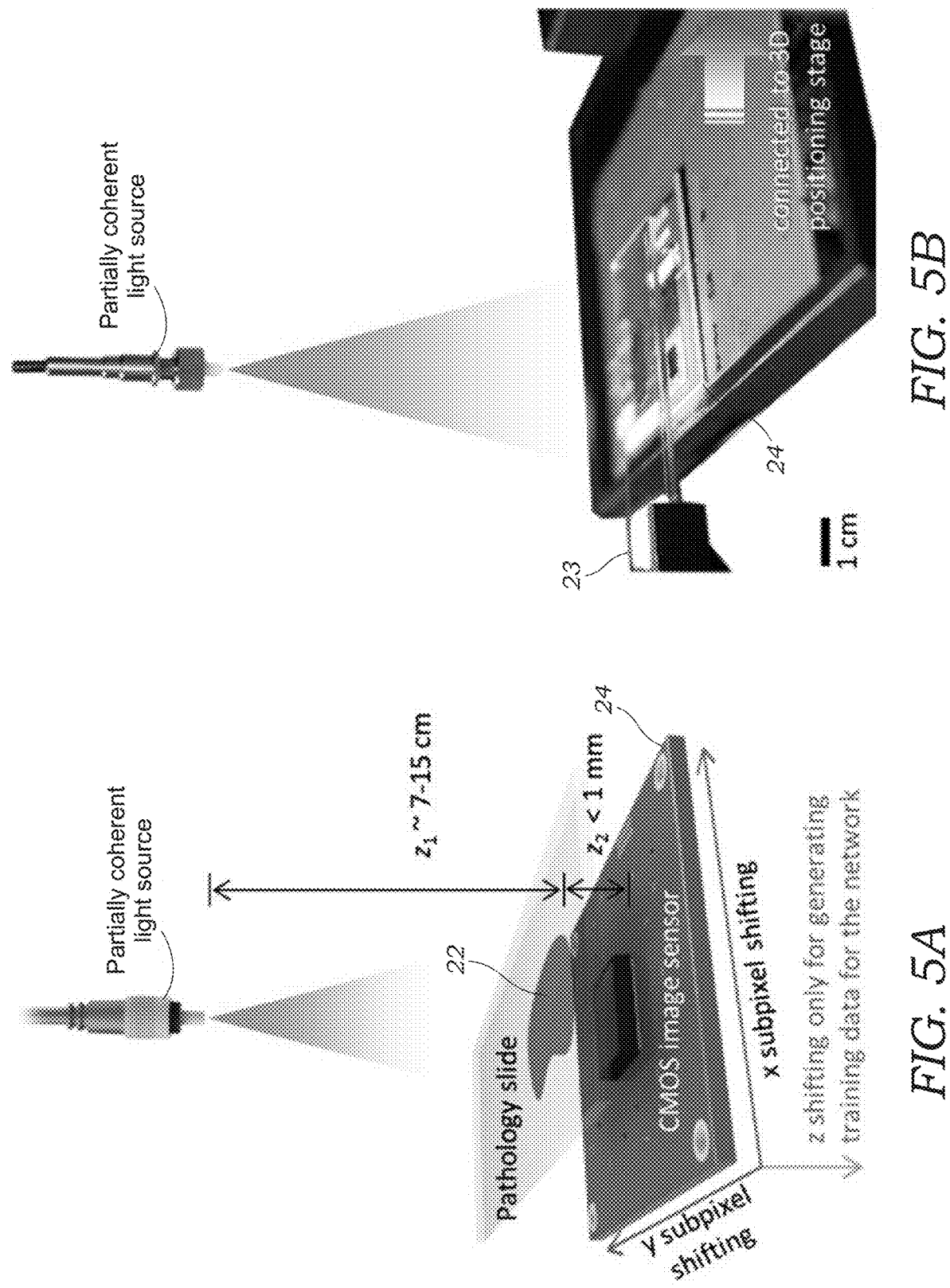
FIG. 5A illustrates a schematic illustration of the holographic imaging setup used to generate the hologram images of the pathology slides. Note that z shifting at multiple heights was used only for training data for the neural network and was used for multi-height phase retrieval for "gold standard" benchmarking.
FIG. 5B is a photographic image of the holographic imaging setup.

The framework described above for performing phase retrieval and holographic image reconstruction of an imaged sample was demonstrated using lens-free digital in-line holography of transmissive samples including human tissue sections, blood and Pap smears as outlined below. Due to the dense and connected nature of these samples that were imaged, their holographic in-line imaging requires the acquisition of multiple holograms for accurate and artifact-free object recovery. A schematic of the experimental set-up is shown in FIGS. 5A and 5B where the sample is positioned very close to a CMOS sensor chip (i.e., image sensor 24), with <1 mm sample-to-sensor distance, which provides an important advantage in terms of the sample field of view that can be imaged. However, due to this relatively short sample-to-sensor distance the twin-image artifact of in-line holography, which is a result of the lost phase information, is rather strong and severely obstructs the spatial features of the sample in both the amplitude and phase channels.

The first step in the deep learning-based phase retrieval and holographic image reconstruction framework involves "training" of the neural network 10, i.e., learning the statistical transformation between a complex-valued image that results from the back-propagation of a single hologram intensity of the sample 22 (or object(s) in the sample 22) and the same image of the sample 22 (or object(s) in the sample 22) that is reconstructed using a multi-height phase retrieval algorithm (multi-height is treated herein as the "gold standard" or "ground truth" for the training phase) using eight (8) hologram intensities acquired at different sample-to-sensor distances. A simple back-propagation of the sample or object's hologram, without phase retrieval, contains severe twin-image and interference-related related artifacts, hiding the phase and amplitude information of the object. This training/learning process (which needs to be performed only once to fix the trained, convolutional neural network 10) results in a fixed deep neural network 10 that is used to blindly reconstruct, using a single hologram intensity image 20, amplitude and phase images 50, 52 of any sample 22 or objects within the sample 22, substantially free from twin-image and other undesired interference related artifacts.

Figure 4:
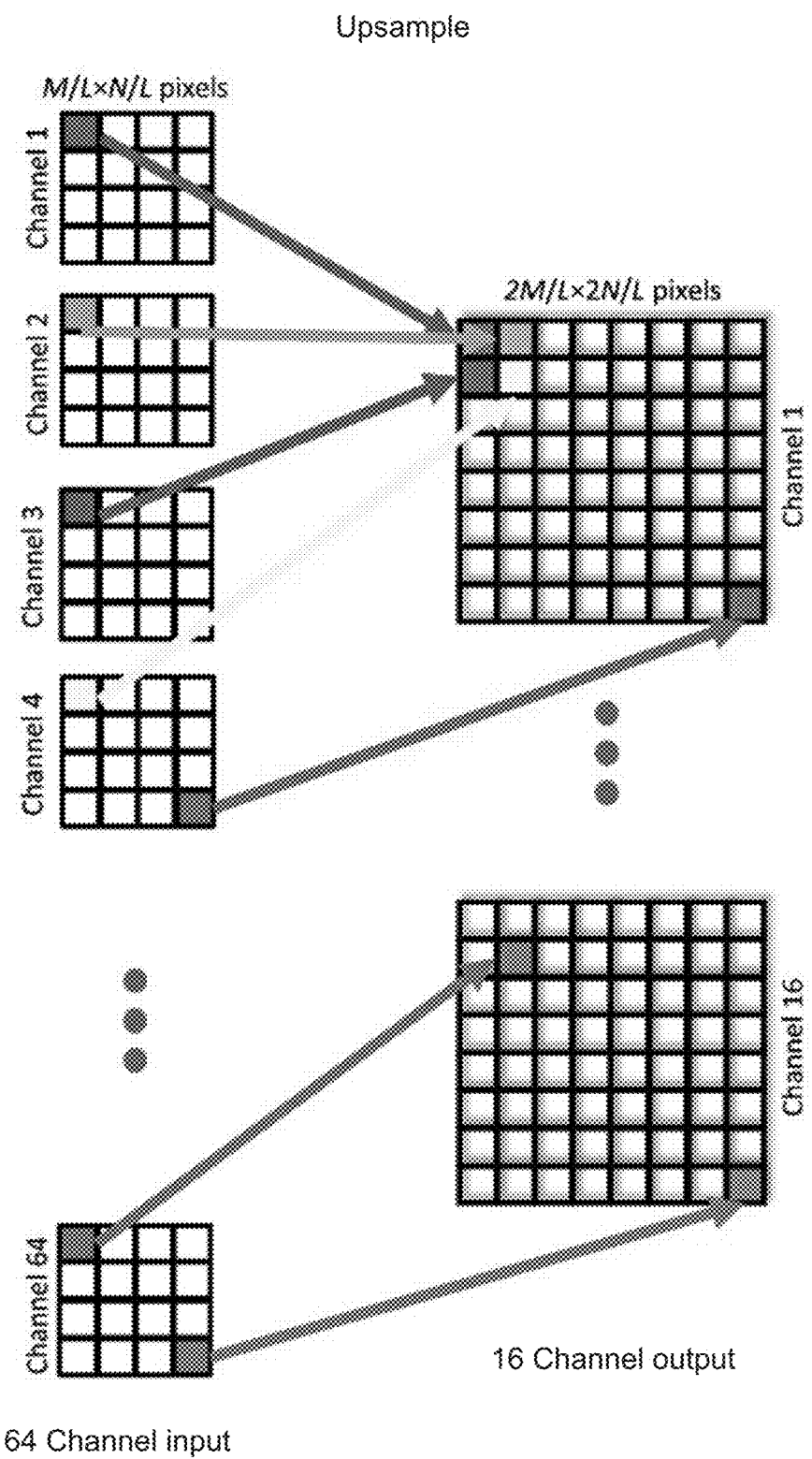
FIG. 4 illustrates a schematic representation of the upsampling layer of the deep neural network.

In the holographic imaging experiments, three different types of samples were used, i.e., blood smears, Pap smears and breast tissue sections, and separately trained three convolutional neural networks 10 for each sample type, although the network architecture was identical in each case as shown in FIGS. 2-4. To avoid over-fitting of the neural network, the training was stopped once the deep neural network performance on the validation image set (which is entirely different than the training image set as well as the blind testing image set) starts to reduce. The trained neural network 10 was made compact and applied pooling approaches. Following the training process, each deep neural network 10 (for each tissue type) was blindly tested with different objects that were not used in the training or validation image sets. FIGS. 2, 3, 6A-6P demonstrate some of these neural network-based blind reconstruction results for Pap smears, breast tissue sections and blood smears. These reconstructed phase and amplitude images clearly demonstrate the success of the deep neural network-based holographic image reconstruction approach to blindly infer artifact-free phase and amplitude images of the objects, matching the performance of multi-height phase recovery. Table 1 below further compares the structural similarity (SSIM) of the neural network output images (using a single input hologram, i.e., $N_{holo}=1$) against the results obtained with a traditional multi-height phase retrieval algorithm using multiple holograms (i.e., $N_{holo}=2, 3, \ldots, 8$) acquired at different sample-to-sensor distances.

TABLE 1

| Sample type | Reconstruction method | | | | | | | | |
|---|---|---|---|---|---|---|---|---|---|
| | Deep network input ($N_{holo}=1$) | Deep network output ($N_{holo}=1$) | Multi-height phase-recovery ($N_{holo}=2$) | Multi-height phase-recovery ($N_{holo}=3$) | Multi-height phase-recover ($N_{holo}=4$) | Multi-height phase-recovery ($N_{holo}=5$) | Multi-height phase-recovery ($N_{holo}=6$) | Multi-height phase-recovery ($N_{holo}=7$) | Multi-height phase-recovery ($N_{holo}=8$) |
| Pap smear real part | 0.726 | 0.895 | 0.875 | 0.922 | 0.954 | 0.979 | 0.985 | 0.986 | 1 |
| Pap smear imaginary part | 0.431 | 0.870 | 0.840 | 0.900 | 0.948 | 0.979 | 0.986 | 0.987 | 1 |
| Blood smear real part | 0.701 | 0.942 | 0.890 | 0.942 | 0.962 | 0.970 | 0.975 | 0.977 | 1 |
| Blood smear imaginary part | 0.048 | 0.93 | 0.46 | 0.849 | 0.907 | 0.935 | 0.938 | 0.955 | 1 |
| Breast tissue real part | 0.826 | 0.916 | 0.931 | 0.955 | 0.975 | 0.981 | 0.983 | 0.984 | 1 |
| Breast tissue imaginary part | 0.428 | 0.912 | 0.911 | 0.943 | 0.970 | 0.979 | 0.981 | 0.982 | 1 |

Table 1 includes a comparison of the SSIM index values for the deep neural network output images obtained from a single hologram intensity against multi-height phase retrieval results for different number of input holograms ($N_{holo}$), corresponding to Pap smear samples, breast tissue histopathology slides and blood smear samples. In each case, the SSIM index is separately calculated for the real and imaginary parts of the resulting complex-valued image with respect to the multi-height phase recovery result for $N_{holo}=8$, and by definition, the last column on the right has an SSIM index of 1 (it being the "gold standard"). Due to the presence of twin-image and interference-related artifacts, the first column formed by the input images has, by far, the worst performance.

A comparison of the SSIM index values reported in Table 1 demonstrates that the imaging performance of the deep neural network 10 using a single hologram 20 is comparable to that of multi-height phase retrieval, e.g., closely matching the SSIM performance of $N_{holo}=2$ for both Pap smear and breast tissue samples, and the SSIM performance of $N_{holo}=3$ for blood smear samples. In other words, the deep neural network-based reconstruction approach reduces the number of holograms that needs be acquired by 2-3 times. In addition to this reduction in the number of holograms, the computation time for holographic reconstruction using a neural network is also improved by approximately 3-fold and 4-fold compared to multi-height phase retrieval with $N_{holo}=2$ and $N_{holo}=3$, respectively as seen in Table 2, below.

sec) is used for other operations such as pixel super-resolution, auto-focusing and back-propagation.

The phase retrieval performance of the trained neural network 10 is further demonstrated by imaging red blood cells (RBCs) in a whole blood smear. Using the reconstructed phase images of RBCs, the relative phase delay with respect to the background (where no cells are present) is calculated to reveal the phase integral per RBC (given in units of rad·μm²—see FIG. 7A), which is directly proportional to the volume of each cell, V. Due to the twin-image and other interference-related spatial artifacts, the effective cell volume and the phase integral values calculated using the network input image demonstrated a highly random behavior, as shown with the scattered dots in FIG. 7A, which is significantly improved by the network output, shown with the darker dots in FIG. 7A.

Next, to evaluate the tolerance of the trained neural network 10 and its holographic reconstruction framework to axial defocusing, the hologram intensity of breast tissue section was digitally back-propagated to different depths, i.e., defocusing distances within a range of z=[−20 μm, +20 μm] with Δz=1 μm increments. After this defocusing, each resulting complex-valued image was fed as input to the same fixed neural network (which was trained by using in-focus images, i.e., z=0 μm). The amplitude SSIM index of each network output was evaluated with respect to the multi-height phase recovery image with $N_{holo}=8$ used as the reference (see FIG. 8A). Although the deep neural network 10 was trained with in-focus images, FIGS. 8C-8H clearly

TABLE 2

| | Deep neural network output ($N_{holo}=1$) | Multi-height phase-recover ($N_{holo}=2$) | Multi-height phase-recovery ($N_{holo}=3$) | Multi-height phase-recovery ($N_{holo}=4$) | Multi-height phase-recover ($N_{holo}=5$) | Multi-height phase-recovery ($N_{holo}=6$) | Multi-height phase-recovery ($N_{holo}=7$) | Multi-height phase-recovery ($N_{holo}=8$) |
|---|---|---|---|---|---|---|---|---|
| Runtime (sec) | 7.24 | 23.20 | 28.32 | 32.11 | 35.89 | 38.28 | 43.13 | 47.43 |

Table 2 shows a comparison of the holographic image reconstruction runtime for a field of view of ~1 mm² for different phase recovery approaches. All the reconstructions were performed on a laptop using a single GPU. Out of the 7.24 sec required for neural network-based image reconstruction from a single hologram intensity, the deep neural network processing time is 3.90 sec and the rest (i.e., 3.34 demonstrates the ability of the trained neural network 10 to blindly reconstruct defocused holographic images with a negligible drop in image quality across the imaging system's depth of field, which is ~4 μm.

Discussion

In a digital in-line hologram, the intensity of the light incident on the sensor array can be written as:

$$I(x,y)=|A+a(x,y)|^2=|A|^2+|a(x,y)|^2+A^*a(x,y)+Aa^*(x,y) \quad (1)$$

where A is the uniform reference wave that is directly transmitted, and a(x,y) is the complex-valued light wave that is scattered by the sample. Under plane wave illumination, one can assume A to have zero phase at the detection plane, without loss of generality, i.e., A=|A|. For a weakly scattering object, one can potentially ignore the interference term, $|a(x,y)|^2$, compared to the other terms in equation (1) since $|a(x, y)| \ll A$. As detailed below, none of the samples that were imaged in this work satisfies this weakly scattering assumption, i.e., the root-mean-squared (RMS) modulus of the scattered wave was measured to be approximately 28%, 34% and 37% of the reference wave RMS modulus for breast tissue, Pap smear and blood smear samples, respectively. That is why, for in-line holographic imaging of such strongly-scattering and structurally-dense samples, interference-related terms, in addition to twin-image, form strong image artifacts in both phase and amplitude channels of the sample, making it nearly impossible to apply object support-based constraints for phase retrieval. This necessitates additional holographic measurements for traditional phase recovery and holographic image reconstruction methods, such as the multi-height phase recovery approach that was used for comparison as described herein. Without increasing the number of holographic measurements, the deep neural network-based phase retrieval technique can learn to separate/clean phase and amplitude images of the objects from twin-image and interference-related spatial artifacts as illustrated in FIGS. 2, 3, 6A-6P, 7A-7H. In principle one could also use off-axis interferometry for imaging of such strongly scattering samples. However, this would create a penalty for resolution or field-of-view of the reconstructed images due to the reduction in the space-bandwidth product of an off-axis imaging system.

Another important property of the deep neural network-based holographic reconstruction framework is the fact that it significantly suppresses out-of-focus interference artifacts, which frequently appear in holographic images due to e.g., dust particles or other imperfections in various surfaces or optical components of the imaging set-up. Some of these naturally occurring artifacts are also highlighted in FIGS. 6F, 6G, 6N, 6O with arrows, which were cleaned in the corresponding network output images, FIGS. 6D, 6E, 6L, 6M. This property is especially important for coherent imaging systems since various unwanted particles and features form holographic fringes on the sensor plane, super-imposing on the object's hologram, which degrade the perceived image quality after image reconstruction.

Finally, although the exact same neural network architecture depicted in FIGS. 2-4 was used for all the object types, the convolutional neural network for different types of objects (e.g., breast tissue vs. Pap smear) were separately trained, which was then fixed after the training process to blindly reconstruct phase and amplitude images of any object of the same type. This does not pose a limitation since in most imaging experiments the type of the sample is known, although its microscopic features are unknown and need to be revealed by a microscope. This is certainly the case for biomedical imaging and pathology since the samples are prepared (e.g., appropriately stained and fixed) with the correct procedures, tailored for the type of the sample. Therefore, the use of an appropriately trained "optimal" neural network for a given type of sample (for example a tissue sample using a particular stain or stains) can be considered very well aligned with traditional uses of digital microscopy tools.

Figure 10:
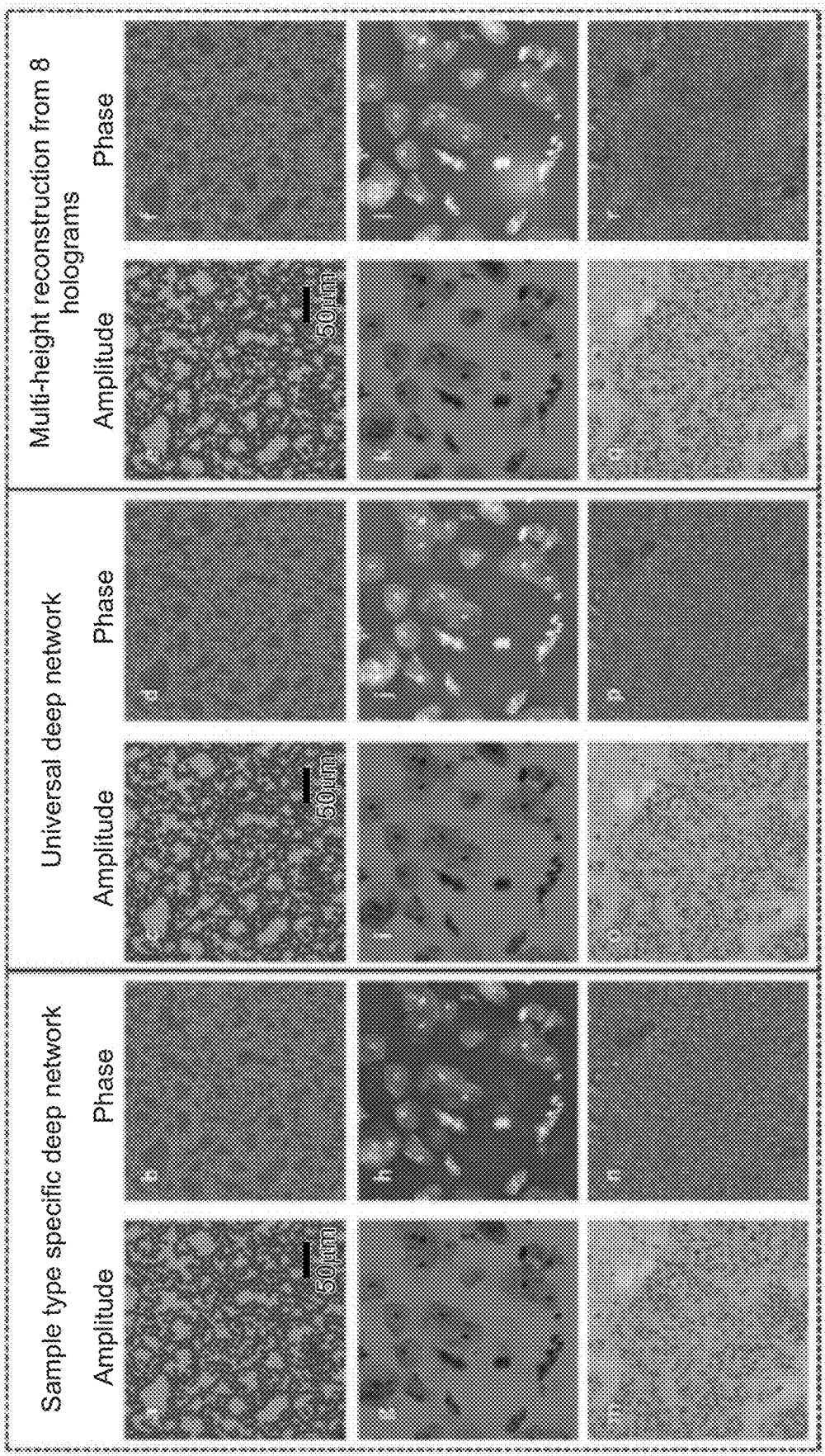
FIG. 10 illustrates a comparison of holographic image reconstruction results for sample type-specific and universal deep networks for different types of samples (in addition to multi-height "gold standard" images). Deep neural network results used a single hologram intensity as input, whereas $N_{holo}$=8 was used for the column on the right. Panel images (a-f) are from a blood smear. Panel images (g-l) are from a Papanicolaou smear. Panel images (m-r) are from a breast tissue section.

Having emphasized this point, a "universal" trained deep neural network 10 was created and tested that can reconstruct different types of objects after its training, still based on the same architecture. To handle different object or sample types using a single trained neural network 10, the number of feature maps in each convolutional layer was increased from sixteen to thirty-two, which also increased the complexity of the deep neural network 10, leading to increased training times, while the reconstruction runtime (after the network is fixed) marginally increased from e.g., 6.45 sec to 7.85 sec for a field-of-view of 1 mm$^2$ (see Table 2). Table 1 also compares the SSIM index values that are achieved using this universal network 10, which performed very similar to individual object type specific networks 10. A further comparison of holographic image reconstructions that are achieved by this universal network against object type specific networks is also provided in FIG. 10, revealing the same conclusion as in Table 1.

Methods

Multi-Height Phase Recovery

To generate ground truth amplitude and phase images used to train the deep neural network 10, phase retrieval was achieved by using a multi-height phase recovery method. Multi-height phase retrieval is described in, for example, Greenbaum et al., Maskless imaging of dense samples using pixel super-resolution based multi-height lensfree on-chip microscopy, Opt. Express 20, 3129 (2012), which is incorporated by reference herein. For this purpose, the image sensor 24 was shifted in the z direction away from the sample by ~15 µm increments 6 times, and ~90 µm increment once, resulting in 8 different relative z positions of approximately 0 µm, 15 µm, 30 µm, 45 µm, 60 µm, 75 µm, 90 µm and 180 µm. These positions are referred to as the 1st, 2nd, ..., 8th heights, respectively. The holograms at the 1st, 7th and 8th heights were used to initially calculate the optical phase at the 7th height, using the transport of intensity equation (TIE) through an elliptic equation solver, implemented in MATLAB software. Combined with the square-root of the hologram intensity acquired at the 7th height, the resulting complex field is used as an initial guess for the subsequent iterations of the multi-height phase recovery. This initial guess is digitally refocused to the 8th height, where the amplitude of the guess is averaged with the square-root of the hologram intensity acquired at the 8th height, and the phase information is kept unchanged. This updating procedure is repeated at the 7th, 6th, ..., 1st heights, which defines one iteration of the algorithm. Usually, 10-20 iterations give satisfactory reconstruction results. However, in order to ensure the optimality of the phase retrieval for the training of the network, the algorithm iterated 50 times, after which the complex field is back-propagated to the sample plane, yielding the amplitude and phase, or, real and imaginary images of the sample. These resulting complex-valued images are used as the ground truth images and are used to train the network and provide comparison images to the blind testing of the network output.

Generation of Training Data

To generate the training data for the deep neural network 10, each resulting complex-valued object image from the multi-height phase recovery algorithm as well as the corresponding single hologram back-propagation image (which includes the twin-image and interference-related spatial artifacts) are divided into 5×5 sub-tiles, with an overlap amount of 400 pixels in each dimension. For each sample type, this results in a dataset of 150 image pairs (i.e., complex-valued input images to the network and the corresponding multi-height reconstruction images), which are divided into 100 image pairs for training, 25 image pairs for validation and 25 image pairs for blind testing. The average computation time for each neural network training process (which needs to be done only once) was approximately 14.5 hours.

Speeding Up Holographic Image Reconstruction Using GPU Programming

The pixel super-resolution and multi-height phase retrieval algorithms are implemented in C/C++ and accelerated using CUDA Application Program Interface (API). These algorithms are run on a laptop computer using a single NVIDIA GeForce® GTX 1080 graphics card. The basic image operations are implemented using customized kernel functions and are tuned to optimize the GPU memory access based on the access patterns of individual operations. GPU-accelerated libraries such as cuFFT and Thrust are utilized for development productivity and optimized performance. The TIE initial guess is generated using a MATLAB-based implementation, which is interfaced using MATLAB C++ engine API, allowing the overall algorithm to be kept within a single executable after compilation.

Sample Preparation

Breast tissue slide: Formalin-fixed paraffin-embedded (FFPE) breast tissue is sectioned into 2 μm slices and stained using hematoxylin and eosin (H&E). The de-identified and existing slides are obtained from the Translational Pathology Core Laboratory at UCLA.

Pap smear: De-identified and existing Papanicolaou smear slides were obtained from UCLA Department of Pathology.

Blood smear: De-identified blood smear slides are purchased from Carolina Biological (Item #313158).

Network Architecture

The deep neural network architecture is detailed in FIGS. 2-4. The real and imaginary parts (30, 32) of the back-propagated hologram intensity 20 are used as two input image channels to the deep neural network 10, each with a size of M×N pixels (e.g., M=1392, N=1392). These two channels of the network are then used simultaneously as input to four convolutional layers. The output of each convolutional layer is 16 channels (feature maps), each with a size of M×N pixels, which was empirically determined to balance the deep network size/compactness and performance. The value of x,y-th pixel in the j-th feature map in the i-th convolutional layer is given by $v_{i,j}^{x,y}$:

$$v_{i,j}^{x,y} = \sum_r \sum_{p=0}^{P-1} \sum_{q=0}^{Q-1} w_{i,j,r}^{p,q} v_{i-1,r}^{x+p,y+q} + b_{i,j} \qquad (2)$$

where $b_{i,j}$ is a common bias term for the j-th feature map, r indicates the set of the feature maps in the i−1 layer (which is 2, for the first convolutional layer), $w_{i,j,r}^{p,q}$ is the value of the convolution kernel at the p,q-th position, P and Q define the size of the convolutional kernels, which is 3×3 throughout the network in this implementation.

The output of these four convolutional layers is then downsampled by ×1, ×2, ×4, ×8, creating 4 different data flow paths, with 16 channels and spatial dimensions of M×N, M/2×N/2, M/4×N/4 and M/8×N/8, respectively. This multi-scale data processing scheme was created to allow the network to learn how to suppress the twin-image and interference-related artifacts, created by objects with different feature sizes. The output of these downsampling operators is followed by four residual blocks, each composed of two convolutional layers and two activation functions (FIG. 3), which were chosen to implement as rectified linear units (ReLU), i.e., ReLU(x)=max(0,x). Following the four residual blocks, data at each scale are upsampled to match the original data dimensions. Each upsampling block (i.e., U/S block in FIG. 3) contains a convolutional layer that takes sixteen channels, each with M/L×N/L pixels as input, and outputs sixty-four channels each with M/L×N/L pixels (L=2, 4, 8). This is followed by a ReLU operation and an upsampling layer, which is schematically detailed in FIG. 4. This layer learns to upsample a 64-channel input (each with M/L×N/L pixels) to a 16-channel output (each with 2M/L× 2N/L pixels). This upsampling process is being performed once, twice, or three times, for the ×2, ×4, ×8 spatially downsampled network inputs, respectively (see FIG. 3). The output of each one of these four different dataflow paths (with 16 channels, M×N pixels, following the upsampling stage) is concatenated to a sixty-four channels input, which results in two channels: one for the real part and one for the imaginary part of the object image, each having M×N pixels.

Figure 9:
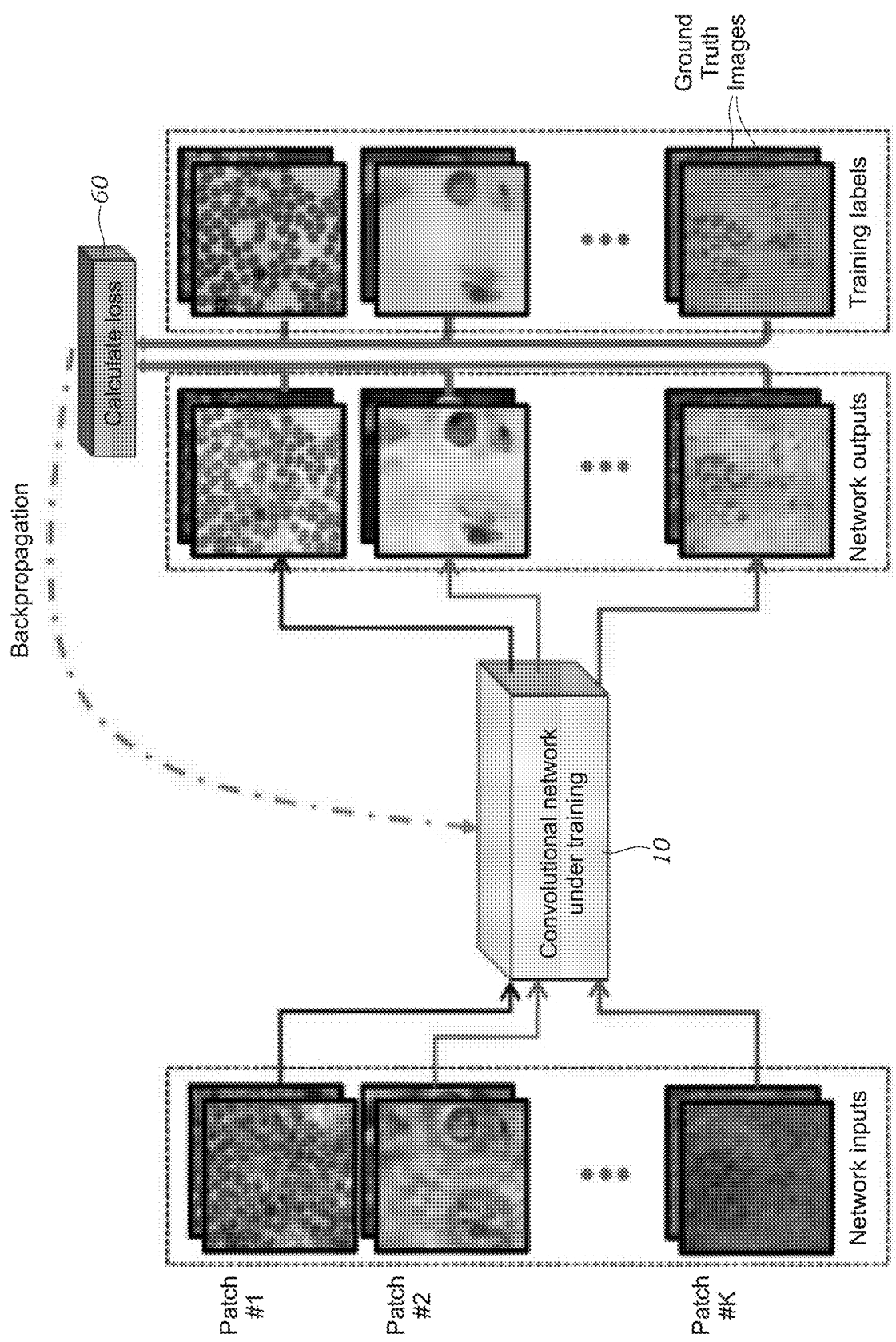
FIG. 9 schematically illustrates training of the universal deep neural network that can reconstruct images of different kinds of objects.
Figure 11:
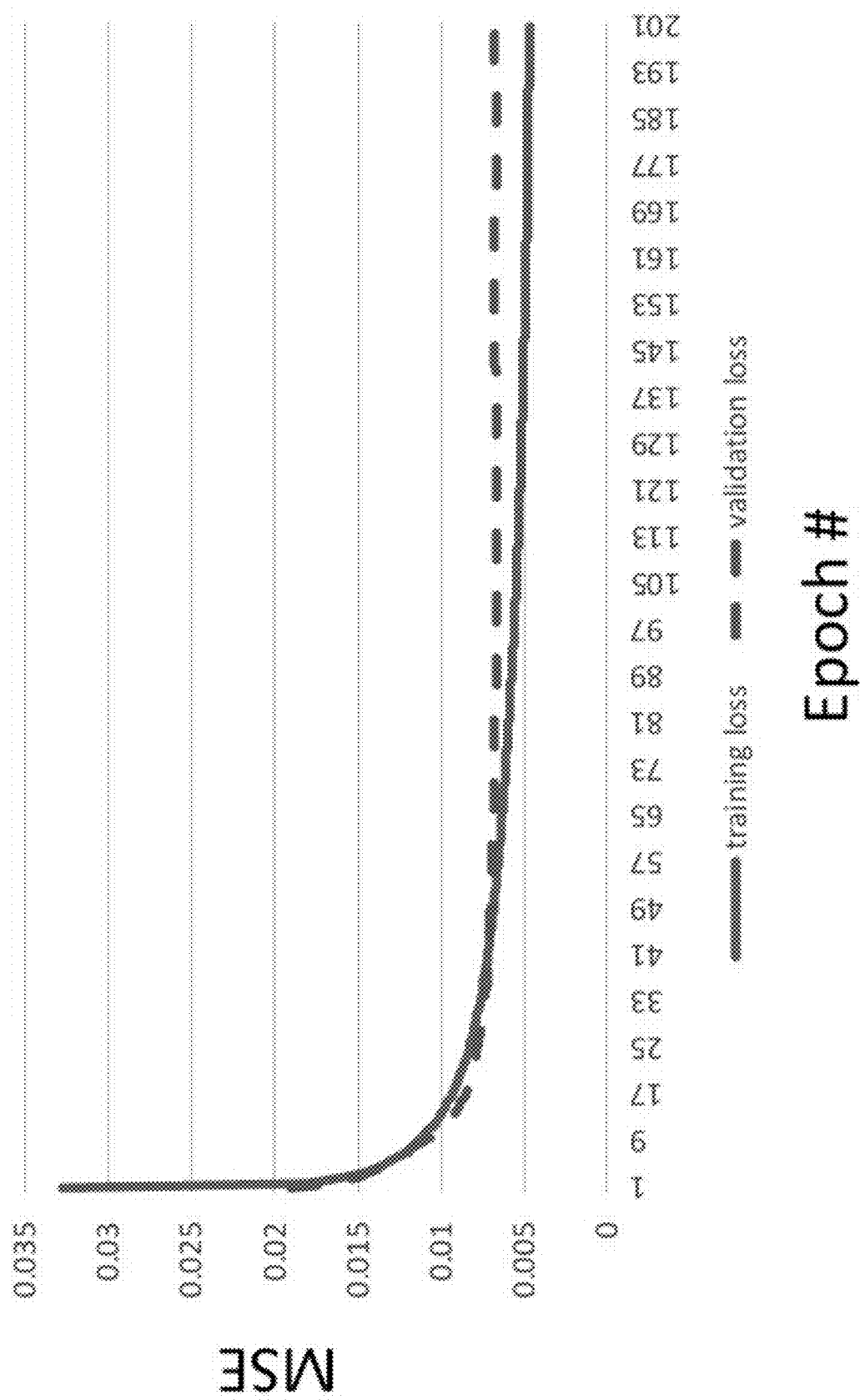
FIG. 11 illustrates a graph showing training and validation dataset errors as a function of the number of epochs.

To train the deep neural network 10, the average of the mean-squared-errors of the real and imaginary parts of the network output with respect to the real and imaginary parts of the object's ground truth images (obtained using multi-height phase retrieval with eight holograms recorded at different sample-to-sensor distances.) were minimized. This loss function over a mini-batch of K input patches (images) is calculated as:

$$\text{Loss}(\Theta) = \frac{1}{2}\left\{ \frac{1}{M \times N} \sum_{m=1}^{M \times N} \sum_{n=1}^{M \times N} \|Y_{Re,m,n}^{\Theta} - Y_{Re,m,n}^{GT}\|^2 + \right. \qquad (3)$$

$$\left. \frac{1}{M \times N} \sum_{m=1}^{M \times N} \sum_{n=1}^{M \times N} \|Y_{Im,m,n}^{\Theta} - Y_{Im,m,n}^{GT}\|^2 \right\}$$

where $Y_{Re,m,n}^{\Theta}$, $Y_{Im,m,n}^{\Theta}$ denote the m,n-th pixel of real and imaginary network outputs, respectively, and $Y_{Re,m,n}^{GT}$, $Y_{Im,m,n}^{GT}$ denote the m,n-th pixel of real and imaginary parts of the training (i.e., ground truth) labels, respectively. The network's parameter space (e.g., kernels, biases, weights) is defined by $\Theta$ and its output is given by $[Y_{Re}^{\Theta}, Y_{Im}^{\Theta}] = F(X_{Re,input}, X_{Im,input}; \Theta)$, where F defines the deep neural network's operator on the back propagated complex field generated from a single hologram intensity, divided into real and imaginary channels, $X_{Re,input}, X_{Im,input}$, respectively. Following the estimation of the loss function, the resulting error in the network output is back-propagated through the network and the Adaptive Moment Estimation (ADAM) based optimization was used to tune the network's parameter space, $\Theta$, with a learning rate of $10^{-4}$. For the sample type specific network training, a batch size of K=2 was used and an image size of 1392×1392 pixels. For the universal deep network, the image dataset was divided to 256×256-pixel patches (with an overlap of 20% between patches) and a mini-batch of K=30 as seen in FIG. 9. All the convolutional kernel entries are initialized using a truncated normal distribution. All the network bias terms, $b_{i,j}$ are initialized to 0. In case the size of the input image is not divisible by 8, zero padding is performed on it such that it becomes divisible by 8. As an example, the progression of the universal deep network training is shown in FIG. 11 by plotting the training and validation dataset errors as a function of the number of training epochs (i.e., the number of passes on the entire dataset with backpropagation through the network).

Network Implementation Details

For programming, Python version 3.5.2 was used and the deep neural network 10 was implemented using TensorFlow framework version 1.0 (Google). A laptop computer with Core i7-6700K CPU@4 GHz (Intel) and 64 GB of RAM, running a Windows 10 operating system (Microsoft) was used. The network training was performed using GeForce GTX 1080 (NVidia) Dual Graphical Processing Units (GPUs). The testing of the network was performed on a single GPU to provide a fair comparison against multi-height phase retrieval CUDA implementation, as summarized in Table 2.

Optical Set-Up

In the experimental set-up (FIGS. 5A, 5B) a laser source (SC400, Fianium Ltd., Southampton, UK) was used that was filtered by an acousto-optic tunable filter and coupled to a single mode optical fiber to provide partially coherent illumination with a spectral bandwidth of ~2.5 nm. A CMOS image sensor (e.g., image sensor 24) with 1.12 μm pixel size and 16.4 Megapixel (IMX081, Sony Corp., Japan) was used to capture the holographic images. The distance ($z_1$) from the optical fiber tip to the sample is between 7 and 15 cm, such that the light that is incident on the sample can be considered a quasi-plane wave. The distance ($z_2$) from the sample to the image sensor plane is approximately 300-700 μm. This unit magnification geometry ($z_1 >> z_2$) results in a large field of view that is equal to the image sensor's active area. The image sensor 24 was mounted on a 3D positioning stage (NanoMax 606, Thorlabs Inc., New Jersey, US), which moved it in x and y directions in sub-pixel-size steps to implement pixel super-resolution (PSR). The image sensor was also shifted in the z direction with step sizes of a few tens of microns to perform multi-height phase recovery to generate training data for the neural network. A custom-written LabVIEW program implemented on a desktop computer was used to control and automate all of these components as part of the imaging set-up.

Pixel Super Resolution (PSR)

In order to mitigate the spatial undersampling caused by the relatively large pixel pitch of the image sensor chip (~1.12 μm), multiple subpixel-shifted holograms were used to synthesize a higher resolution (i.e., pixel super-resolved) hologram. For this, the image sensor was mechanically shifted by a 6-by-6 rectangular grid pattern in the x-y plane, with increments of 0.37 μm, corresponding to approximately ⅓ of the image sensor's pixel size. A 6-by-6 grid ensured that one color channel of the Bayer pattern could cover its entire period. In an alternative design with a monochrome image sensor (instead of an RGB sensor), only a 3-by-3 grid would be needed to achieve the same PSR factor. For this PSR computation, an efficient non-iterative fusion algorithm was applied to combine the sub-pixel shifted images into one higher-resolution hologram, which preserves the optimality of the solution in the maximum likelihood sense such as is described in Farsiu et al., Fast and Robust Multiframe Super Resolution, IEEE Trans. Image Process. 13, 1327-1344 (2004), which is incorporated herein by reference. The selection of which color channel (R, G or B) of the Bayer pattern to use for holographic imaging is based on pixel sensitivity to the illumination wavelength that is used. For example, at ~530 nm illumination, the two green channels of the Bayer pattern were used, and at ~630 nm, the red channel was used.

Calculation of Red Blood Cell (RBC) Phase Integral and Effective Refractive Volume The relative optical phase delay due to a cell, with respect to the background, can be approximated as:

$$\varphi(x, y) = \frac{2\pi d(x, y) \cdot \Delta n(x, y)}{\lambda} \quad (4)$$

where d(x,y) is the thickness of the sample (e.g., an RBC) as a function of the lateral position, $\Delta n(x,y) = n(x,y) - n_0$ is the refractive index difference between the sample (n(x,y)) and the background medium ($n_0$), $\lambda$ is the illumination wavelength in air. Based on these, the phase integral for a given RBC image is defined as:

$$p_i = \left| \int_{S_i} \varphi(x, y) ds \right| = \left| \int_{S_i} \frac{2\pi d(x, y) \Delta n(x, y)}{\lambda} ds \right| \quad (5)$$

which calculates the relative phase with respect to the background that is integrated over the area of each RBC (defined by $S_i$), which results in a unit of rad·μm². Let $\Delta n$ represent the average refractive index difference within each cell (with respect to $n_0$), one can then write:

$$p_i = \frac{2\pi \cdot |\Delta n|}{\lambda} \int_{S_i} d(x, y) \cdot ds = \frac{2\pi \cdot |\Delta n|}{\lambda} \cdot V_i \quad (6)$$

where $V_i$ represents the volume of the ith cell. Because the average refractive index of a fixed and stained RBC (as one would have in a blood smear sample) is hard to determine or estimate, instead the effective refractive volume of an RBC is defined as:

$$\tilde{V}_i = |\Delta n| \cdot V_i = \frac{p_i \lambda}{2\pi} \quad (7)$$

which also has the unit of volume (e.g., femtoliter, fL).

Structural Similarity (SSIM) Index Calculation

The structural similarity index between two images $I_1$ and $I_2$ can be calculated as:

$$SSIM(I_1, I_2) = \frac{(2\mu_1 \mu_2 + c_1)(2\sigma_{1,2} + c_2)}{(\mu_1^2 + \mu_2^2 + c_1)(\sigma_1^2 + \sigma_2^2 + c_2)} \quad (8)$$

where $\mu_1$ is the average of $I_1$, $\mu_2$ is the average of $I_2$, $\sigma_1^2$ is the variance of $I_1$, $\sigma_2^2$ is the variance of $I_2$, $\sigma_{1,2}$ is the cross-covariance of $I_1$ and $I_2$. The stabilization constants ($c_1$, $c_2$) prevent division by a small denominator and can be selected as $c_1 = (K_1 L)^2$ and $c_2 = (K_2 L)^2$, where L is the dynamic range of the image and $K_1$, $K_2$ are both much smaller than 1. SSIM index between two images ranges between 0 and 1 (the latter for identical images).

Evaluation of Scattering Strength of the Samples

To evaluate the validity of the weakly scattering condition, i.e., $|a(x, y)| << A$ for the samples that were imaged), a region of interest for each of the samples was taken that is reconstructed using the multi-height phase recovery, based on 8 hologram heights. After the phase recovery step, one has:

$$u = A + a(x, y) \quad (9)$$

where A can be estimated by calculating the average value of a background region where no sample is present. After A is estimated, one can calculate a normalized complex image $\tilde{u}$, $$\tilde{u} = \frac{u}{A} = 1 + \frac{a(x, y)}{A} \quad (10)$$

Next, R is defined as the ratio between the root-mean-squared (RMS, or quadratic mean) modulus of the scattered wave |a(x,y)| divided by the reference wave modulus |A|, to obtain:

$$R = \frac{\langle |a(x,y)|^2 \rangle^{1/2}}{|A|} = \langle |\tilde{u} - 1|^2 \rangle^{1/2} \quad (11)$$

where $\langle \square \rangle$ denotes 2D spatial averaging operation. This ratio, R, is used to evaluate the validity of the weakly scattering condition for the samples, and is found to be 0.28, 0.34, and 0.37 for the breast tissue, Pap smear and blood smear samples that were imaged, respectively.

Calculation of the Sample-to-Sensor Distance

The relative separation between successive image sensor heights (or hologram planes) needs to be estimated in order to successfully apply the TIE and multi-height phase recovery algorithms, and the absolute $z_2$ distance (i.e., the sample-to-sensor distance—see FIGS. 5A, 5B) is needed for the final back-propagation of the recovered complex wave onto the sample plane. Estimating the relative z-separation is done by using an autofocusing algorithm based on the axial magnitude differential. For computational efficiency, first a coarse scan is done between 100 μm and 800 μm with a step size of 10 μm. Then, around the minimum that is found by this coarse scan, a golden section search algorithm is applied to locate the minimum with a final precision of 0.01 μm. The absolute $z_2$ is refined after the convergence of the multi-height phase recovery algorithm by refocusing the phase-recovered hologram near the previously found focus point.

Figure 12:
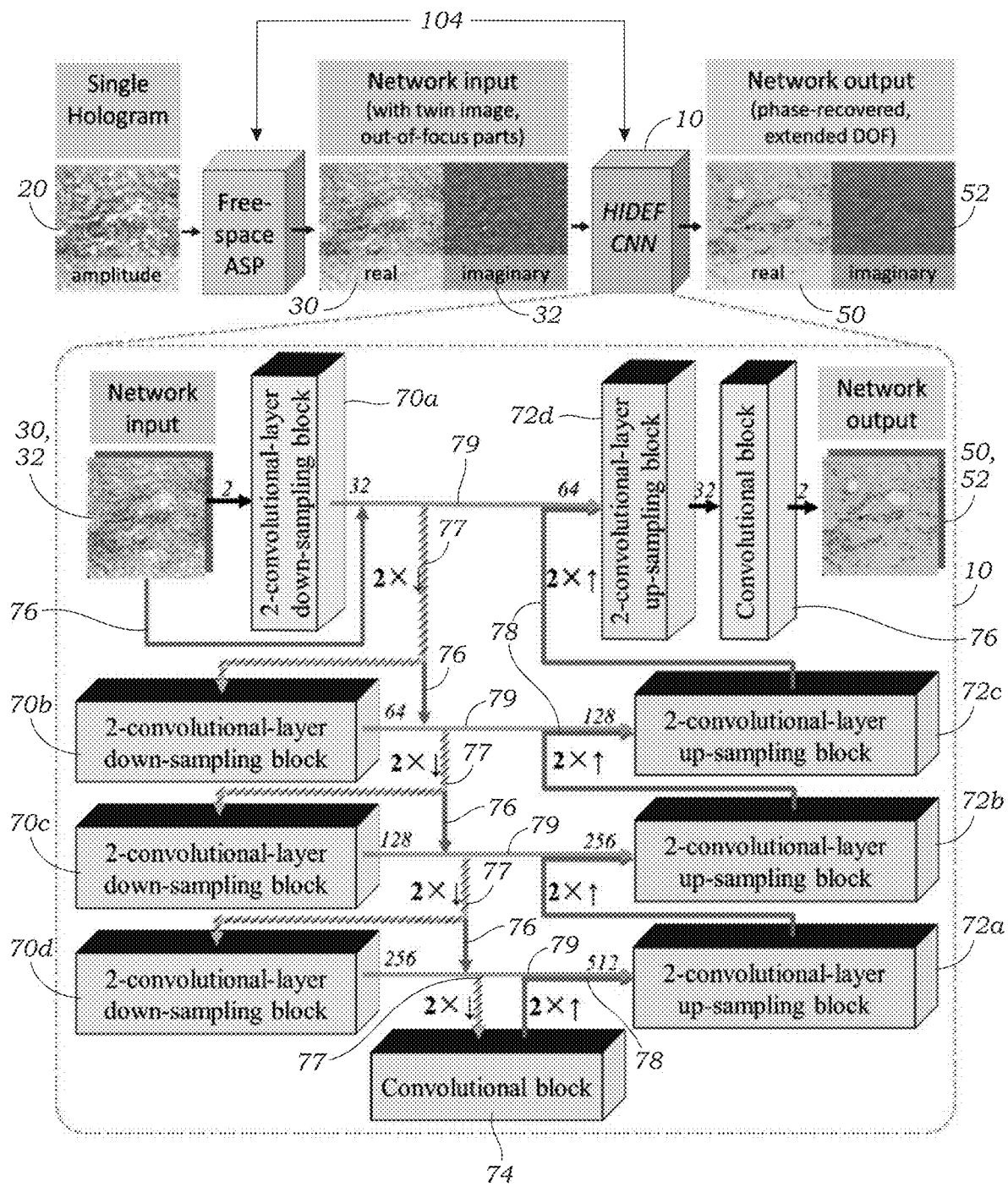
FIG. 12 illustrates the operation of the HIDEF CNN, after its training, which simultaneously achieves phase-recovery and auto-focusing, significantly extending the DOF of holographic image reconstruction. The network has a down-sampling decomposition path (arrows 77) and a symmetric up-sampling expansion path (arrows 78). The arrows 76 mark the paths that skip through the convolutional layers (defining the residual connections). The numbers in italic represent the number of the input and output channels in these blocks at different levels. The arrows 79 represent the connections between the down-sampling and up-sampling paths, where the channels of the output from the down-sampling block are concatenated with the output from the corresponding up-sampling block, doubling the channel numbers. ASP: angular spectrum propagation.

FIG. 12 illustrates another embodiment of a trained deep neural network 10 that performs both auto-focusing and phase-recovery at the same time using a single hologram intensity 20, which significantly extends the depth-of-field (DOF) of the reconstructed image compared to previous approaches, while also improving the algorithm time-complexity of holographic image reconstruction from O(nm) to O(1). This approach, which is also referred to herein as HIDEF (Holographic Imaging using Deep learning for Extended Focus), relies on training a CNN deep neural network 10 with in-focus image patches and randomly de-focused holographic images along with their corresponding in-focus and phase-recovered images, used as reference. Overall, HIDEF boosts the computational efficiency of high-resolution holographic imaging by simultaneously performing auto-focusing and phase-recovery and increases the robustness of the image reconstruction process to potential misalignments in the optical set-up by significantly extending the DOF of the reconstructed images.

In one embodiment, a method of performing simultaneous phase-recovery and auto-focusing of a hologram intensity image 20 of a sample 22 is disclosed. The system 2 for outputting amplitude and phase images 50, 52 from a single hologram image 20 illustrated in FIG. 1 may also be used for simultaneous phase-recovery and auto-focusing. The sample 22 may include one or more objects therein. These objects may include particles, cells (stained or unstained), or other micro-scale objects. The method includes obtaining a single hologram intensity image 20 of the sample 22 using an image sensor 24 and back propagating the single hologram intensity image 20 to generate a real input image 30 and an imaginary input image 32 of the sample 22, wherein the real input image 30 and the imaginary input image 32 contain twin-image and/or interference-related artifacts. The method uses a trained deep neural network 10 (i.e., a convolutional neural network) that is executed on image processing software 104 using one or more processors 102, the trained deep neural network 10 trained with pairs of randomly back-propagated de-focused images and their corresponding in-focus phase-recovered images, wherein the trained deep neural network 10 is configured to receive the real input image 30 and the imaginary input image 32 of the sample 22 and generate an output real image 50 and an output imaginary image 52 of one or more objects in the sample 22 in which the twin-image and/or interference-related artifacts are substantially suppressed or eliminated and the output real and/or imaginary images (i.e., the object images) are in-focus.

In one embodiment, the de-focused images that are used to train the deep neural network 10 are obtained over an axial defocus range and wherein the single hologram intensity image 20 that is obtained by the image sensor 24 is back propagated to a location within this axial defocus range. This axial defocus range may vary. In one embodiment, the axial defocus range is less than about 10 mm or in other embodiments less than 5 mm. In still other embodiments, this range is smaller, e.g., less than 1 mm or less than 0.5 mm.

The architecture of the trained deep neural network 10 for HIDEF is shown in FIG. 12. The trained deep neural network 10 is a CNN and it consists of a down-sampling path 70a-70d as well as a symmetric up-sampling path 72a-72d, each including convolution blocks 74, 76 with a kernel size of 3×3, followed by Rectified Linear Unit (ReLU) operators (not illustrated in FIG. 12 but similar to those illustrated in FIG. 3). Through a chain of down-sampling operations, the network learns to capture and separate the true image and twin image spatial features of a holographic input field at different scales. Additional short-cut paths 76 are also included to pass the information forward through residual connections, which are useful to increase the training speed of the network.

The down-sampling path consists of four down-sampling blocks, where each block contains one residual block with two convolutional layers that map the input tensor $x_k$ into $x_{k+1}$, for a given level k:

$$x_{k+1} = x_k + \text{ReLU}[\text{CONV}_{k_2}\{\text{ReLU}[\text{CONV}_{k_1}\{x_k\}]\}] \quad (12)$$

where ReLU stands for rectified linear unit operation, and CONV stands for the convolution operator (including the bias terms). The subscript $k_1$ and $k_2$ denote the number of channels in the convolutional layers in each down-sampling block. The number of channels of the output block in each level is marked in FIG. 12, i.e., $k_2$=32, 64, 128, 256 in the down-sampling path. The numbers of intermediate channels, i.e., $k_1$=17, 48, 96, 192, refer to the averages between the input and output channels of the block. The arrows 76 in FIG. 12 represent the residual connections (i.e. the "+" operation in Equation (12)). Zero padding is used on the input $x_k$ to compensate the mismatch between the number of input and output channels.

The connection between consecutive down-sampling blocks is a 2× down-sampling operation (down arrows 77 in FIG. 12), which is defined by a 2×2 max-pooling layer with stride of 2 pixels in both directions. Following the output of the fourth downsampling block, another convolutional layer maintains the number of feature maps as 256, before connecting it to the up-sampling path. The up-sampling path consists of four up-sampling blocks symmetric with the down-sampling path. Each up-sampling block is a symmetric (transpose) operation of the down-sampling block:

$$y_{k+1} = \text{ReLU}[\text{CONV}_{k_4}\{\text{ReLU}[\text{CONV}_{k_3} \{\text{CAT}(x_{k+1}, y_k)\}]\}] \quad (13)$$

Where CAT(.) stands for the concatenation of the tensors along the channel direction, which is represented by the arrows 78, 79 in parallel as seen in FIG. 12. The number of the channels of the output block in each level, as marked in FIG. 12, is given by: $k_4$=32, 64, 128, 256. The number of the intermediate channels in the up-sampling path, $k_3$, is obtained by the average of the input number of channels and the output number of channels, i.e., k3=48, 96, 192, 384. The connection between two consecutive up-sampling blocks is a 2× up-sampling operation using bilinear interpolation. The last layer is a convolutional layer mapping 32 channels into 2 channels, i.e., the real and imaginary parts of the complex-valued output image/field; that is to say the real image 50 and imaginary image 52. All the convolutional blocks use a convolutional kernel with a size of 3×3 pixels, a stride of one pixel, and replicate padding of one pixel to maintain the height and width of the tensor during the convolution operation. These kernels are randomly initialized using Xavier initialization of weights. The network biases were initialized to 0.1. During the training, for each 512×512 patch, 30 random regions with random rotations of 256×256 pixel is cropped and used to update the network. During the validation and testing phases, image patches of 512×512 pixels are evaluated by the network.

This CNN architecture was implemented using Tensor-Flow, an open-source deep learning software package. During the training phase, the CNN minimizes the l1-norm distance of the network output from the target/reference images (e.g., operation 60 of FIG. 3), and iteratively updates the network's weights and biases using the adaptive moment estimation (Adam) optimizer, with a learning rate of $10^{-4}$. For each image dataset, the ratio of the training to cross-validation was set to 14:3. The training and blind testing of the network were performed on a PC with six-core 3.60 GHz CPU, 16 GB of RAM, using Nvidia GeForce GTX 1080Ti GPU. On average, the training process takes ~40 h for e.g., 200,000 iterations, corresponding to ~100 epochs. After the training, the network inference time for a hologram patch of 512×512 pixels (with phase and amplitude channels) is <0.3 s.

Experimental—Phase Retrieval and Holographic Image Reconstruction with Autofocusing To demonstrate the success of HIDEF, in the initial set of experiments, aerosols were captured by a soft impactor surface and imaged by an on-chip holographic microscope, where the optical field scattered by each aerosol interferes with the directly transmitted light forming an in-line hologram, sampled using a CMOS imager, without the use of any lenses. The captured aerosols on the substrate are dispersed in multiple depths ($z_2$) as a result of varying particle mass, flow speed, and flow direction during the air sampling period. Based on this set-up, the training image dataset had 176 digitally-cropped non-overlapping regions that only contained particles located at the same depth, which are further augmented by 4-fold to 704 regions by rotating them to 0, 90, 180 and 270 degrees. For each region, a single hologram intensity was used (i.e., hologram intensity 20) and back-propagated it to 81 random distances, spanning an axial range of −100 μm to 100 μm away from the correct global focus, determined by auto-focusing using the Tamura of the Gradient criterion. These complex-valued fields were then used as the input to the network. The target images used in the training phase (i.e., the reference images corresponding to the same samples) were reconstructed using multi-height phase-recovery (MH-PR) that utilized 8 different in-line holograms of the sample, captured at different $z_2$ distances, to iteratively recover the phase information of the sample, after an initial auto-focusing step performed for each height.

After this training phase, the HIDEF network was blindly tested on samples that had no overlap with the training or validation sets; these samples contained particles spread across different depths per image FOV. FIGS. 13A-13C illustrate the success of HIDEF and how it simultaneously achieves an extended DOF and phase-recovery. For a given in-line hologram of the captured aerosols (FIG. 13A), the hologram intensity is first back-propagated to a coarse distance of $z_2$=1 mm away from the active area of the CMOS imager, which is roughly determined based on the effective substrate thickness used in the experiment. This initial back-propagated hologram yields a strong twin image because of the short propagation distance (~1 mm) and the missing phase information. This complex-valued field, containing both the true and twin images, is then fed to the CNN. The output of the CNN is shown in FIG. 13A (right image), which demonstrates the extended DOF of HIDEF with various aerosols, spread over an axial range of ~90 μm, that are all brought into focus at the network output. In addition to bringing all the particles contained in a single hologram to a sharp focus, the network also performed phase-recovery, resulting in phase and amplitude images that are free from twin image and interference-related related artifacts. FIGS. 13B and 13C also compare the results of the network output with respect to a standard MH-PR approach that used eight in-line holograms to iteratively retrieve the phase information of the sample. These comparisons clearly demonstrate both the significantly extended DOF and phase-recovery performance of HIDEF, achieved using a single hologram intensity with a non-iterative inference time of <0.3 s. In comparison, the iterative MH-PR approach took ~4 s for phase-recovery and an additional ~2.4 s for auto-focusing to the individual objects at eight planes, totaling ~6.4 s for the same FOV and object volume, i.e., >20-fold slower compared to HIDEF.

As described above, a coarse back-propagation step of 1 mm, before feeding the CNN with a complex-valued field. An important feature of this approach is that this back-propagation distance, $z_2$, does not need to be precise. The stability of the HIDEF output image can be seen as one varies the initial back-propagation distance, providing the same extended DOF image regardless of the initial $z_2$ selection. This is very much expected since the network was trained with defocused holograms spanning an axial defocus (dz) range of +/−0.1 mm. For this specific FOV, all the aerosols that were randomly spread in 3D experienced a defocus amount that is limited by +/−0.1 mm (with respect to their correct axial distance in the sample volume). Beyond this range of defocusing, the HIDEF network cannot perform reliable image reconstruction since it was not trained for that (see e.g.,|dz|>120 μm in FIG. 12C. In fact, outside of its training range, HIDEF starts to hallucinate features, which covers a much larger axial defocus range of −1 mm≤dz≤1 mm; beyond what the network was trained for.

Interestingly, although the network was only trained with globally de-focused hologram patches that only contain particles at the same depth/plane, it learned to individually focus various particles that lie at different depths within the same FOV (see FIG. 12A). Based on this observation, one can argue that the HIDEF network does not perform the physical equivalent of free-space back-propagation of a certain hologram FOV to a focus plane. Instead, it statistically learns both in-focus and out-of-focus features of the input field, segments the out-of-focus parts and replaces them with in-focus features, in a parallel manner for a given hologram FOV. For example, assume that a FOV has N particles or objects that are contained within a sample volume. Rather than auto-focus each particle or object separately in a one-by-one fashion, the method described herein brings all N objects or particle into focus in parallel. From an algorithm time-complexity perspective, this is a fixed processing time for a given hologram patch, i.e., a complexity of O(1), instead of the conventional O(nm), where n defines the number of individual object points or particles within the 3D sample volume, and m is the discrete focusing search space.

Figure 14:
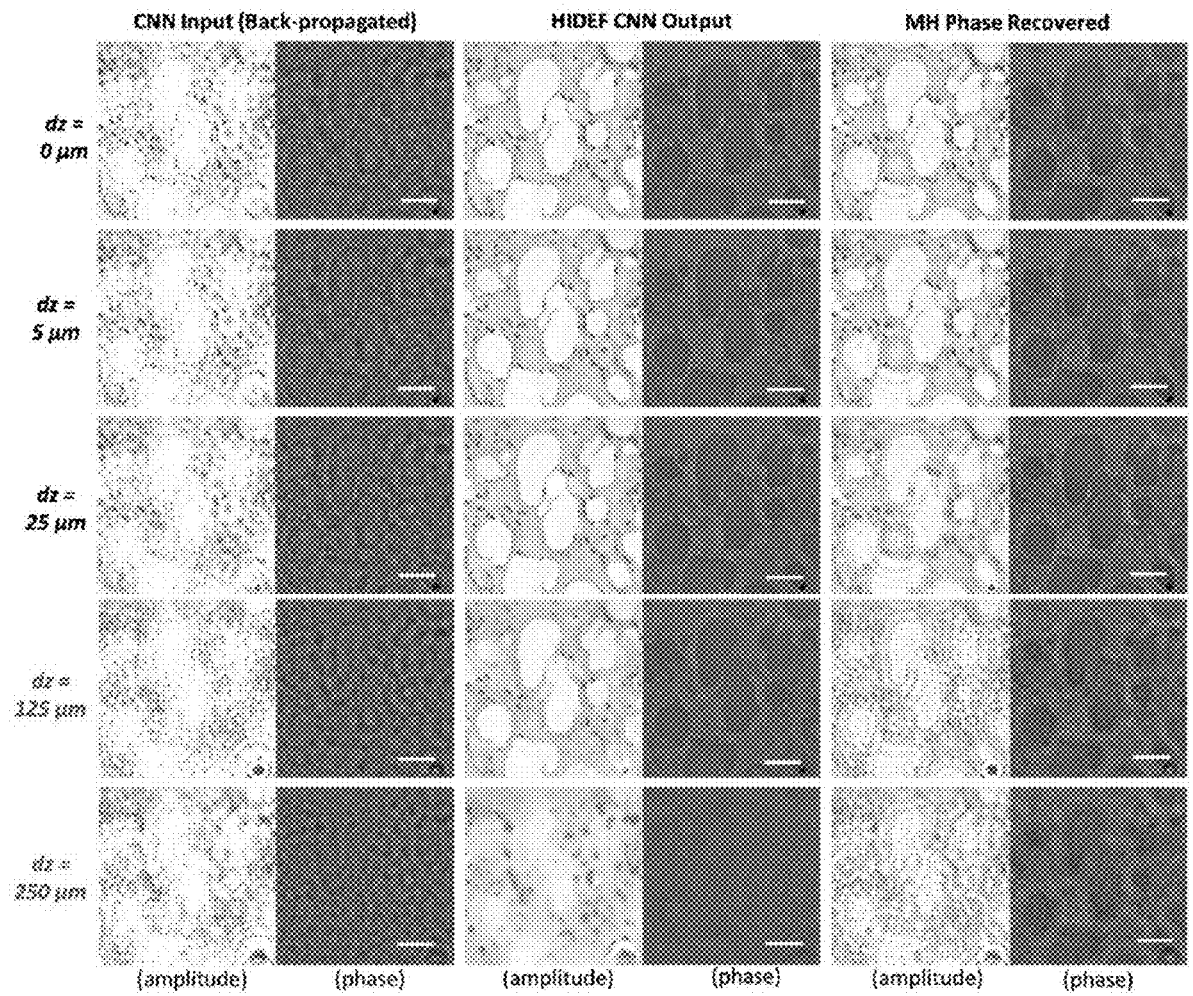
FIG. 14 illustrates a comparison of HIDEF results against free-space back-propagation (CNN Input) and MH-PR (MH Phase Recovered) results, as a function of axial defocus distance (dz). The test sample is a thin section of a human breast tissue sample. The first two columns use a single intensity hologram, whereas the third column (MH-PR) uses eight in-line holograms of the same sample, acquired at different heights. These results clearly demonstrate that the HIDEF network simultaneously performs phase-recovery and auto-focusing over the axial defocus range that it was trained for (i.e., $|dz| \leq 100$ µm in this case). Outside this training range (marked with red dz values), the network output is not reliable. Scale bar: 20 µm.

Based on the above argument, if the network statistically learns both in-focus and out-of-focus features of the sample, one could think that this approach should be limited to relatively sparse objects (such as that illustrated in FIGS. 12A-12C) that let the network learn out-of-focus sample features within a certain axial defocusing range, used in the training. In fact, to test this hypothesis with non-sparse samples, HIDEF was tested on the holograms of spatially connected objects such as tissue slices, where there is no opening or empty region within the sample plane. For this goal, based on the CNN architecture shown in FIG. 12, the network was trained with 1,119 hologram patches (corresponding to breast tissue sections used in histopathology), which were randomly propagated to 41 distances spanning an axial defocus range of −100 μm to 100 μm with respect to the focus plane. In this training phase, MH-PR images were used as the target/reference. The blind testing results, after the training of the network, are summarized in FIG. 14, which clearly demonstrate that HIDEF can simultaneously perform both phase-recovery and auto-focusing for an arbitrary, non-sparse and connected sample. In FIG. 14, one can also see that MH-PR images naturally exhibit a limited DOF: even at an axial defocus of ~5 μm, some of the fine features at the tissue level are distorted. With more axial de-focus, the MH-PR results show significant artificial ripples and loss of further details. HIDEF, on the other hand, is very robust to axial defocusing, and is capable of correctly focusing the entire image and its fine features, while also rejecting the twin image artifact at different de-focus distances, up to the range that it was trained for (in this case ±0.1 mm).

However, as illustrated in FIG. 14, beyond its training range (dz=125 μm and 250 μm), HIDEF starts to hallucinate and create false features. There are several messages that one can take from these observations: the network does not learn or generalize a specific physical process such as wave propagation, or light interference; if it were to generalize such physical processes, one would not see sudden appearances of completely unrelated spatial features at the network output as one gradually goes outside the axial defocus range that it was trained for. For example, if one compares the network output within the training range and outside, one can clearly see that one does not see a physical smearing or diffraction-related smoothening effect as one continues to defocus in a range that the network was not trained for. In this defocus range that is "new" to the network, it still gives relatively sharp, but unrelated features, which indicate that it is not learning or generalizing physics of wave propagation or interference.

To further quantify the improvements made by HIDEF, the amplitude of the network output image was compared against the MH-PR result at the correct focus of the tissue section, and used the structural similarity (SSIM) index for this comparison, defined as:

$$SSIM(U_1, U_2) = \frac{(2\mu_1\mu_2 + C_1)(2\sigma_{1,2} + C_2)}{(\mu_1^2 + \mu_2^2 + C_1)(\sigma_1^2 + \sigma_2^2 + C_2)} \quad (14)$$

where $U_1$ is the image to be evaluated, and $U_2$ is the reference image, which in this case is the auto-focused MH-PR result using eight in-line holograms. $\mu_p$ and $\sigma_p$ are the mean and standard deviation for image $U_p$ (p=1,2), respectively. $\sigma_{1,2}$ is the cross-variance between the two images, and $C_1$, $C_2$ are stabilization constants used to prevent division by a small denominator. Based on these definitions, FIG. 14 shows the mean SSIM index calculated across an axial de-focus range of −100 μm to 100 μm, which was averaged across 180 different breast tissue FOVs that were blindly tested. Consistent with the qualitative comparison reported in FIG. 14, HIDEF outputs SSIM values that are significantly higher than the hologram intensities backpropagated to the exact focus distances, owing to the phase-recovery capability of the network. Furthermore, as shown in FIG. 14, compared to a CNN that is trained using only in-focus holograms (with exact $z_2$ values), HIDEF has a much higher SSIM index for de-focused holograms, across a large DOF of ~0.2 mm. Interestingly, the network that is trained with in-focus holograms beats HIDEF for only one point in FIG. 14, i.e., for dz=0 μm, which is expected as this is what it was specifically trained for. However, this small difference in SSIM (0.78 vs. 0.76) is visually negligible.

Figure 15:
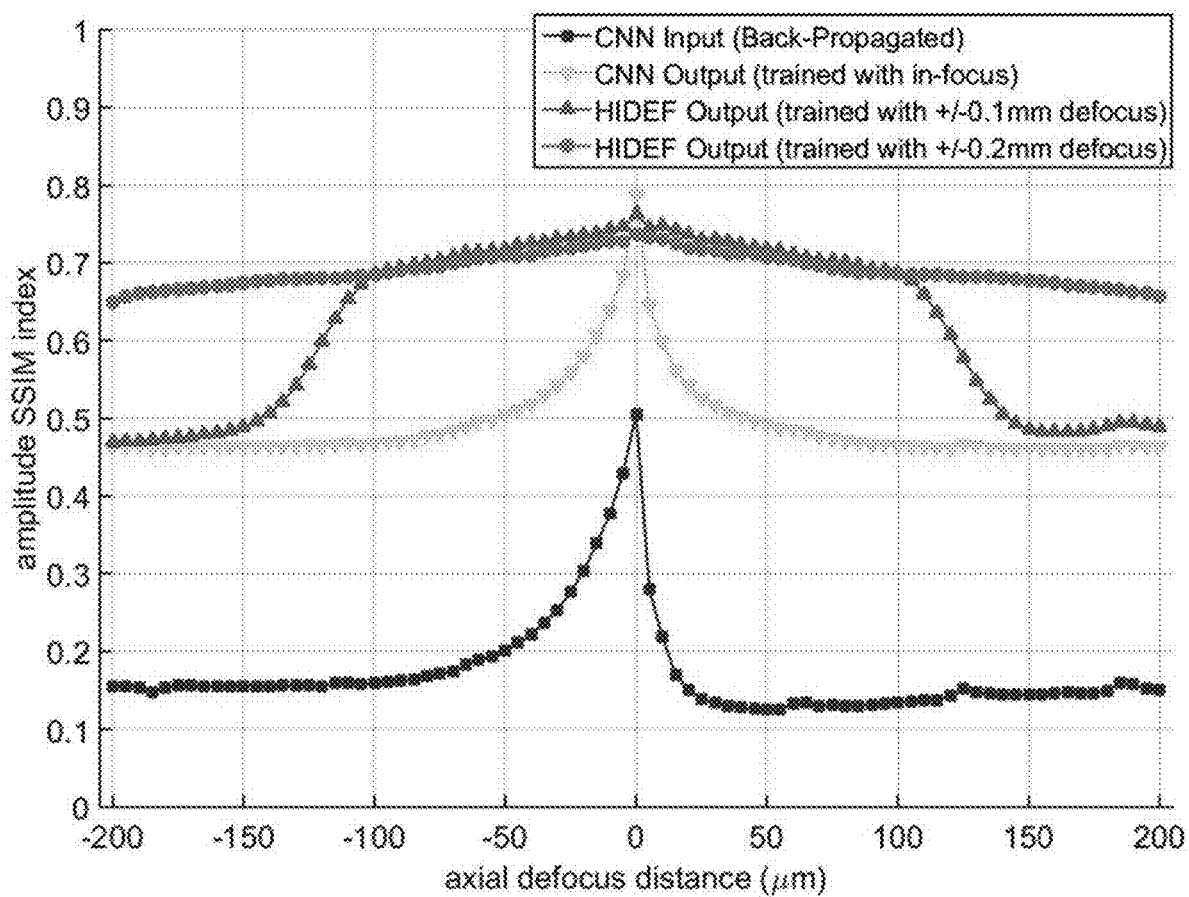

The results demonstrate the unique capabilities of HIDEF network to simultaneously perform phase-recovery and auto-focusing, yielding at least an order of magnitude increase in the DOF of the reconstructed images, as also confirmed by FIGS. 12A-12C and 13. To further extend the DOF of the neural network output beyond 0.2 mm, one can use a larger deep neural network (with more layers, weights and biases) and/or more training data, containing severely defocused images as part of its learning phase. Certainly, the DOF enhancement described herein is not an ultimate limit for the presented approach. In fact, to better emphasize this opportunity a third neural network was trained, following the HIDEF architecture of FIG. 12, with a training image set that contained randomly defocused holograms of breast tissue sections, with an axial defocus range of −0.2 mm to 0.2 mm. The performance comparison of this new network against the previous one (demonstrated in FIG. 14) is reported in FIG. 15. As shown in this comparison, by using a training image set that included even more defocused holograms, the axial defocus range was significantly extended to 0.4 mm (i.e., +/−0.2 mm), where the HIDEF network successfully performed both auto-focusing and phase-recovery, at the same output image.

While embodiments of the present invention have been shown and described, various modifications may be made without departing from the scope of the present invention. The invention, therefore, should not be limited, except to the following claims, and their equivalents. Further, the following publication (and supplemental information/content) is incorporated herein by reference: Wu et al., "Extended depth-of-field in holographic imaging using deep-learning-based autofocusing and phase recovery," Optica 5, 704-710 (June 2018).

What is claimed is:

1. A method of performing phase retrieval and holographic image reconstruction of an imaged sample comprising:

obtaining a single hologram intensity image of the sample using an image sensor;

back propagating the single hologram intensity image with image processing software to generate a real input image and an imaginary input image of the sample, wherein the real input image and the imaginary input image contain twin-image and/or interference-related artifacts; and providing a trained, convolutional neural network that is executed by the image processing software using one or more processors and configured to receive the real input image and the imaginary input image of the sample and generate an output real image and an output imaginary image in which the twin-image and/or interference-related artifacts are substantially suppressed or eliminated.

2. The method of claim 1, wherein the real input image and the imaginary input image are simultaneously input to a plurality of convolutional layers of the trained, convolutional neural network.

3. The method of claim 2, wherein the output of each of the plurality of convolutional layers comprise a multi-channel feature map.

4. The method of claim 3, wherein the output of one or more of the plurality of convolutional layers is downsampled.

5. The method of claim 4, wherein the downsampled output is subject to residual blocks comprising a plurality of convolutional layers and a plurality of activation functions.

6. The method of claim 5, wherein the output from the plurality of convolution layers and the plurality of activation functions is subject to upsampling to generate the output real image and the output imaginary image.

7. The method of claim 6, wherein the single hologram intensity image comprises a hologram image of tissue, cells, or other micro-scale objects disposed on or in a substrate.

8. The method of claim 6, wherein the single hologram intensity image comprises a hologram image of particles, cells, or other micro-scale objects located at various depths.

9. The method of claim 6, wherein the single hologram intensity image comprises a pixel super-resolved image.

10. The method of claim 1, wherein the trained, convolutional neural network is trained by minimizing a loss function using one or more ground truth images of a sample and a plurality of corresponding training images.

11. The method of claim 10, wherein the one or more ground truth images comprise holographic or other images of the sample obtained at different heights.

12. The method of claim 1, wherein the single hologram intensity image is obtained using a lens-free microscope device.

13. The method of claim 1, wherein the single hologram intensity image comprises an electron hologram image or an x-ray hologram image.

14. The method of claim 1, wherein the convolutional neural network is trained using a plurality of training images as well as one or more corresponding ground truth images, and wherein the parameter space of the convolutional neural network comprises kernels, biases, and weights that are established during the training.

15. The method of claim 1, wherein the single hologram intensity image is back propagated by angular spectrum propagation (ASP) or a transformation that is an approximation to ASP executed by the image processing software.

16. A method of performing phase retrieval and holographic image reconstruction of an imaged sample comprising:

obtaining a single hologram intensity image of the sample using an imaging device;

back propagating the single hologram intensity image to generate a real input image and an imaginary input image of the sample with image processing software, wherein the real input image and the imaginary input image contain twin-image and/or interference-related artifacts; and providing a trained deep neural network that is executed by the image processing software using one or more processors and configured to receive the real input image and the imaginary input image of the sample and generate an output real image and an output imaginary image in which the twin-image and/or interference-related artifacts are substantially suppressed or eliminated.

17. A system for outputting improved phase and amplitude images from a single hologram image comprising a computer having one or more processors and having image processing software executed thereon, the image processing software comprising a trained deep neural network that is executed using the one or more processors, wherein the trained deep neural network is trained with one or more ground truth images along with a set of training images which are used to establish parameters for the deep neural network, the image processing software configured to receive a single hologram intensity image of the sample and output an output real image and an output imaginary image in which the twin-image and/or interference-related artifacts are substantially suppressed or eliminated.

18. A method of performing simultaneous phase-recovery and auto-focusing of a hologram intensity image of a sample volume and objects contained therein comprising:

obtaining a single hologram intensity image of the sample volume using an image sensor;

back propagating the single hologram intensity image with image processing software to generate a real input image and an imaginary input image of the sample, wherein the real input image and the imaginary input image contain twin-image and/or interference-related artifacts and out-of-focus objects within the sample; and providing a trained, convolutional neural network that is executed by the image processing software using one or more processors, the trained convolutional neural network trained with pairs of randomly back-propagated de-focused images and their corresponding in-focus phase-recovered images, wherein the trained, convolutional neural network is configured to receive the real input image and the imaginary input image of the sample and generate an output real image and an output imaginary image of one or more objects in the sample in which the twin-image and/or interference-related artifacts are substantially suppressed or eliminated and the output real and/or imaginary images have all of the objects in the sample volume brought into focus, all in parallel.

19. The method of claim 18, wherein the randomly back-propagated de-focused images used to train the convolutional neural network are obtained over an axial defocus range and wherein the single hologram intensity image that is obtained by the image sensor is back propagated to random locations within the axial defocus range.

20. The method of claim 19, wherein the axial defocus range is less than about 10 mm.

21. The method of claim 18, wherein the image processing software executing the trained, convolutional neural network generates an output real image and an output imaginary image in less than ten seconds.

22. The method of claim 18, wherein the hologram intensity image of the sample volume comprises tissue samples, particles, cells, or other micro-scale objects located at various depths within the sample volume.

23. The method of claim 18, wherein the hologram intensity image of the sample volume comprises a stained or unstained tissue sample.

24. The method of claim 18, wherein the real input image and the imaginary input image are simultaneously input to a plurality of convolutional layers of the trained, convolutional neural network.

25. The method of claim 24, wherein the output of one or more of the plurality of convolutional layers is downsampled.

26. The method of claim 25, wherein the downsampled output is subject to residual blocks comprising a plurality of convolution layers and a plurality of activation functions.

27. The method of claim 26, wherein the output from the plurality of convolution layers and a plurality of activation functions is subject to upsampling to generate the output real image and the output imaginary image.

28. The method of claim 18, wherein the single hologram intensity image is back propagated by angular spectrum propagation (ASP) or a transformation that is an approximation to ASP executed by the image processing software.

* * * * *